United States Patent [19]

Bybee

[11] Patent Number: 5,235,525

[45] Date of Patent: Aug. 10, 1993

[54] SERVOVALVE ANALYZER SYSTEM

[75] Inventor: Jimmy L. Bybee, Mission Viejo, Calif.

[73] Assignee: ACL Technologies, Inc., Santa Ana, Calif.

[21] Appl. No.: 839,736

[22] Filed: Feb. 19, 1992

Related U.S. Application Data

[60] Continuation of Ser. No. 471,289, Jan. 26, 1990, abandoned, which is a division of Ser. No. 3,958, Jan. 16, 1987, Pat. No. 4,916,641.

[51] Int. Cl.$^5$ .......................................... G01D 18/00
[52] U.S. Cl. ................................. 364/550; 371/15.1; 371/25.1; 73/3; 364/571.01; 364/571.07
[58] Field of Search ............... 364/138, 139, 146, 176, 364/188, 550, 551.01, 571.01, 571.07; 73/1 R, 3, 239; 91/1, 3, 363 R; 222/5; 371/15.1, 16.1, 16.4, 17, 25.1, 26–28

[56] References Cited

U.S. PATENT DOCUMENTS

| | | | |
|---|---|---|---|
| 2,934,938 | 5/1960 | Rhoades | 73/3 |
| 3,976,864 | 8/1976 | Gordon et al. | 371/26 |
| 4,274,438 | 6/1981 | LaCoste | 91/1 X |
| 4,337,638 | 7/1982 | Leonard et al. | 73/1 |
| 4,418,392 | 11/1983 | Hata | 364/571.07 |
| 4,494,212 | 1/1985 | Muellner | 364/571.07 |
| 4,556,956 | 12/1985 | Dickenson | 364/176 X |
| 4,573,114 | 2/1986 | Ferguson et al. | 364/138 |
| 4,633,422 | 12/1986 | Brauer | 364/571.07 |
| 4,642,636 | 2/1987 | Smith et al. | 364/571.01 |
| 4,858,103 | 8/1989 | Takeuchi et al. | 364/139 X |
| 4,912,468 | 3/1990 | Rust | 364/571.07 |
| 4,980,825 | 12/1990 | Tootell et al. | 364/551.01 X |

OTHER PUBLICATIONS

*Industrial Measurements & Controls Operation Manual* for Servoactuator Test System, P/N 11850, Document No. 100050, dated Dec. 16, 1980.

*Industrial Measurements & Controls Calibration Procedure* for Servoactuator Test System, P/N 11850, Document No. 100051, dated Mar. 3, 1981.

*Primary Examiner*—Jack B. Harvey
*Assistant Examiner*—E. J. Pipala
*Attorney, Agent, or Firm*—Merchant, Gould, Smith, Edell, Welter & Schmidt

[57] ABSTRACT

A fully automatic servovalve analyzer system includes a data processing system, a transducer system, and a transducer interface system connecting the data processing system to the transducer system. The data processing system stores data defining characteristics of transducers connected to a unit under test as well as characteristic data for the unit under test itself and test procedures which are to be performed. After a unit under test has been hydraulically and electrically connected to the analyzer system, the system automatically performs any defined tests, analyzes the results and outputs the results in a preselected human recognizable form.

6 Claims, 14 Drawing Sheets

DIGITAL DATA PROCESSING SYSTEM 18

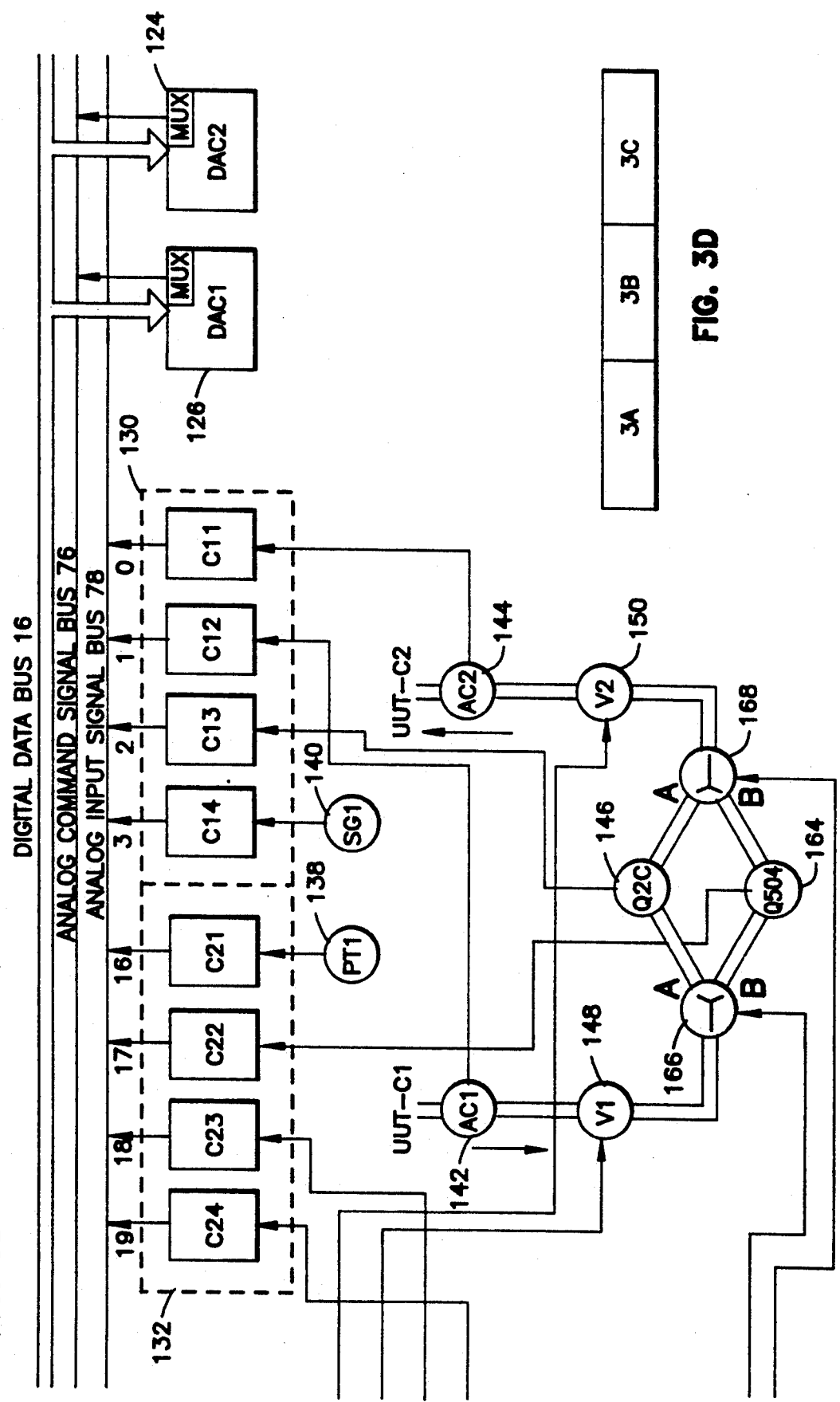

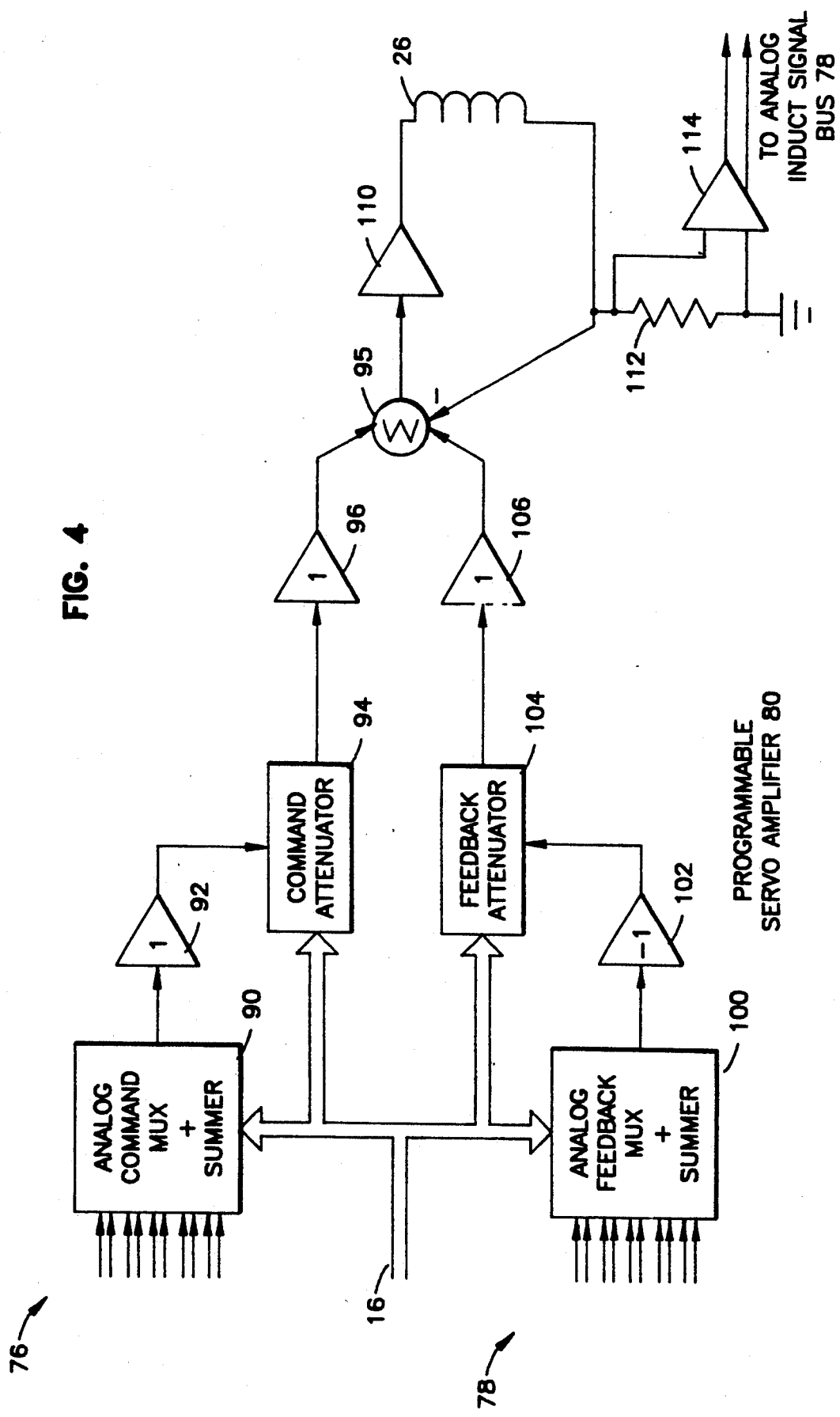

SERVOVALVE ANALYZER SYSTEM

This is a continuation of application Ser. No. 07/471,289, filed Jan. 26, 1990, which was abandoned upon the filing hereof, which is a divisional of application Ser. No. 003,958, filed Jan. 16, 1987, now U.S. Pat. No. 4,916,641.

BACKGROUND OF THE INVENTION

Servovalves are very widely used in aircraft as well as in industrial processes and machine systems because they enable a great deal of power or large forces to be exerted in response to an electrical signal. In the present state of the art, however, extremely high precision is required, and this in turn demands that precise information be gained as to the performance of the servovalve under a great many different static and dynamic conditions. To this end, therefore, there have been developed servovalve analyzers which enable a number of parameters of a unit under test (UUT) to be measured. For a time, a product made by industrial measurements and controls, and described generally in U.S. Pat. No. 2,934,938 was widely used throughout the industry to derive essential servovalve analysis information A knowledgeable operator could, using preset sequences and potentiometer settings, perform an allotted number of tests on a servovalve, the results of which were recorded on an XY plotter, the plots from which could be measured to derive certain essential values.

Subsequently, a data processor-based version of this system was introduced by industrial measurements and controls that was called the "Image 2000". This system was based upon the concept of making available a fixed number of predetermined programs and hardwired circuits for a specific set of servovalves and transducers. With all servovalve characteristics known in advance, this system could accommodate perhaps 20 different servovalves. Present needs, however, demand far more versatility and capability, as well as higher ranges of precision than have heretofore been available. There is a need for what is essentially a generic or universal servovalve analyzer, which can be utilized to analyze many different UUTs having widely varying pressure, flow rate and actuation requirements. It is desirable to accommodate these different servovalves without requiring the generation of new programs, without requiring dedicated systems requiring highly skilled operators for each different valve type, and without requiring readjustment of the system.

For example, servovalve characteristics are dependent on a number of principal factors, including pressure, flow rate, drive signal and the dimensional system (English or Metric) that is used. Analysis is then made of a number of principal parameters, such as flow gain, hysteresis, nonlinearity, asymmetry and saturation. Today, moreover, some or practically all of a number of other specific parameters have to be measured, including (but not limited to) null shift, null area flow gain, threshold, resolution, internal leakage, pressure gain, null pressure, dynamic response at preset points and proof pressure. Because servovalves range widely in size, power demands, pressure levels involved and other characteristics, various servo amplifiers having different current and power characteristics must be used to provide electrical stimuli, and different physical stimuli might also be utilized. Furthermore, because pressure, displacement (position) and flow rates must be measured, each possibly requiring sensing in a plurality of different ranges, many different transducers may have to be made available for each of these ranges. To be able to analyze a thousand or more different UUTs with the accuracy and versatility needed, but without requiring system reconfiguration by the operator or extensive additional programming or computational work, requires that problems be overcome that have not heretofore been faced.

SUMMARY OF THE INVENTION

A fully automatic servovalve analyzer system in accordance with the invention includes a data processing system, a transducer system that is connectable to control and sense characteristics of a unit under test, and a transducer interface system connecting the transducer system to the data processing system. The transducer system includes any pressure, flow rate or strain gage transducers that may be needed to provide test information for a unit under test as well as at least one servovalve drive providing a drive signal that is connected to control the series of operating states of a servovalve that is to be tested. The transducer interface system provides conversion between the digital domain of the data processing system and the analog domain of the transducer system as well as any appropriate amplification and includes an analog bus for coupling signals between different components of the transducer interface system.

The data processing system includes both alterable and permanent data storage, a data input device such as a keyboard for receiving information from an operator, and at least one data output device such as a video display, a printer or a plotter for outputting human recognizable information, a central processing unit and a data bus interconnecting the various components of the data processing system and the transducer interface system. The data processing system receives from an operator and stores in its permanent storage characteristic data for each transducer, amplifier, or other component that affects data relating to a unit under test. For each such component there is stored a block of information including a component name and characteristic data associated with the component such as maximum signal ratings and relationships between input and output signals for the component.

Once a table of characteristic data has been entered for a component, including each servovalve to be tested, the table of characteristic data can, in effect, be incorporated by reference into other characteristic definition tables such as unit under test definitions and test procedure definitions. To facilitate development of the characteristic tables the data processing system is operable to store standard definition tables and to permit any table to be copied and altered to create a new table. The use of name references for previously defined transducers and test units provides the analyzer system with a universal or generic capability which enables it to automatically analyze virtually any model of servovalve.

Upon completion of the electrical and hydraulic connections for a given unit under test the system is operable to automatically perform all defined tests and generate and output the associated analysis data. Alternatively, the system can be operated in a semi-automatic mode wherein each of a sequence of predefined tests for a unit under test is individually selected or excluded by an operator.

BRIEF DESCRIPTION OF THE DRAWINGS

A better understanding of the invention may be had from a consideration of the following Detailed Description taken together with the drawings in which:

FIG. 4 is a schematic and block diagram representation of a programmable servo amplifier that is used in the transducer interface system shown in FIG. 3;

DETAILED DESCRIPTION OF THE INVENTION

Figure 1:
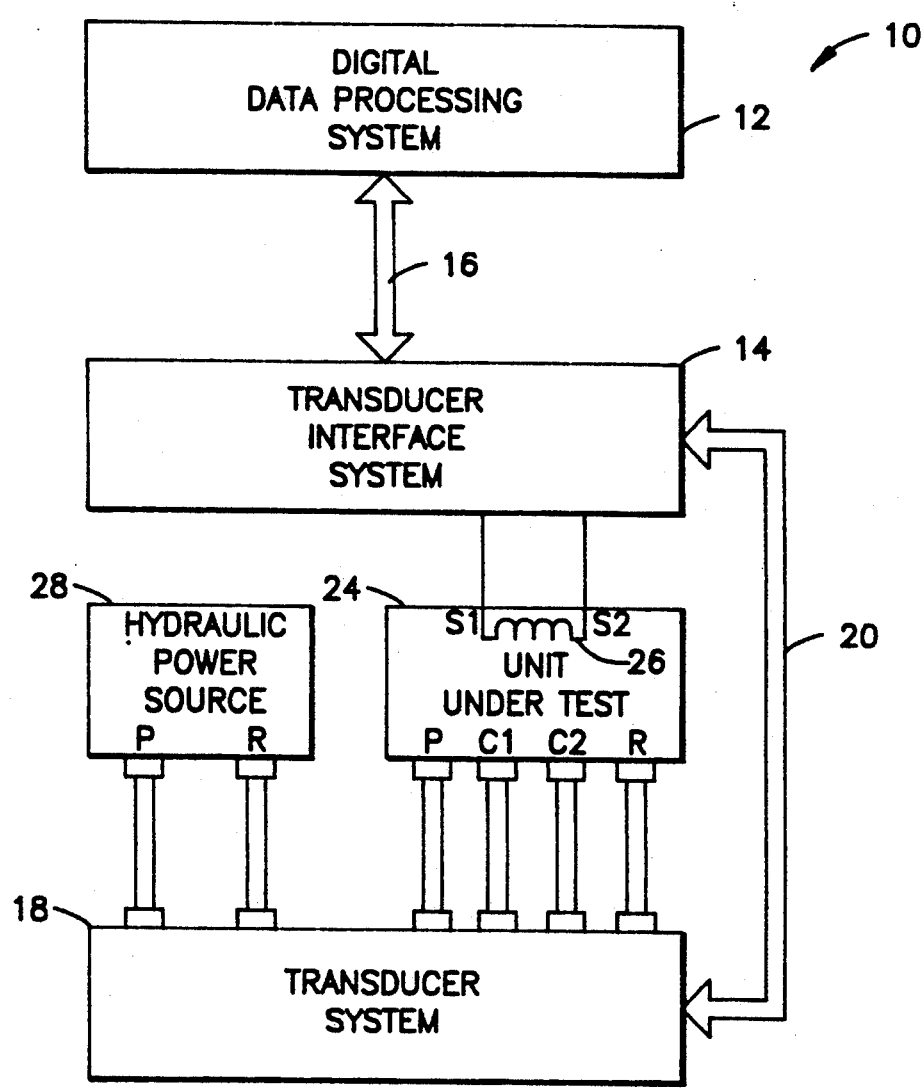
FIG. 1 is a block diagram representation of a servovalve analyzer system in accordance with the invention.

Referring now to FIG. 1, a servovalve analyzer system 10 in accordance with the invention includes a digital data processing system 12, a transducer interface system 14 coupled by a digital data bus 16 to the digital data processing system 12, and a transducer system 18 having a plurality of transducers and shut off valves which are connected by individual signal paths represented by a transducer bus 20 to the transducer interface system 14. A unit under test 24 is represented as a typical servovalve having an actuator coil 26 that is coupled at opposite ends thereof through terminals S1 and S2 to the transducer interface system 14. UUT 24 also has a pressure port, P, which is coupled through transducer system 18 to a pressure port, P, of hydraulic power source 28. UUT 24 also includes a return port, R, which is coupled through transducer system 18 to a return port, R, of hydraulic power source 28. A control port, C1, is coupled through transducer system 18 to a second control port, C2.

In response to a first polarity of current through coil 26, UUT 24 selectively passes hydraulic fluid from port P to port C1 and from port C2 to return port, R. If the current polarity is reversed, the hydraulic fluid is selectively passed from pressure port P to control port C2 and from control port C1 to return port R. Thus, in response to current through coil 26, UUT 24 selectively and bi-directionally controls a flow of fluid between the two control ports, C1 and C2. Depending upon the particular servovalve design, the UUT 24 can provide primarily a pressure controlled flow between parts C1 and C2 or a flow rate controlled flow between ports C1 and C2. Some models of servovalves can of course control both pressure and flow rate. Such servovalves are conventional and will not be described in detail.

Figure 2:
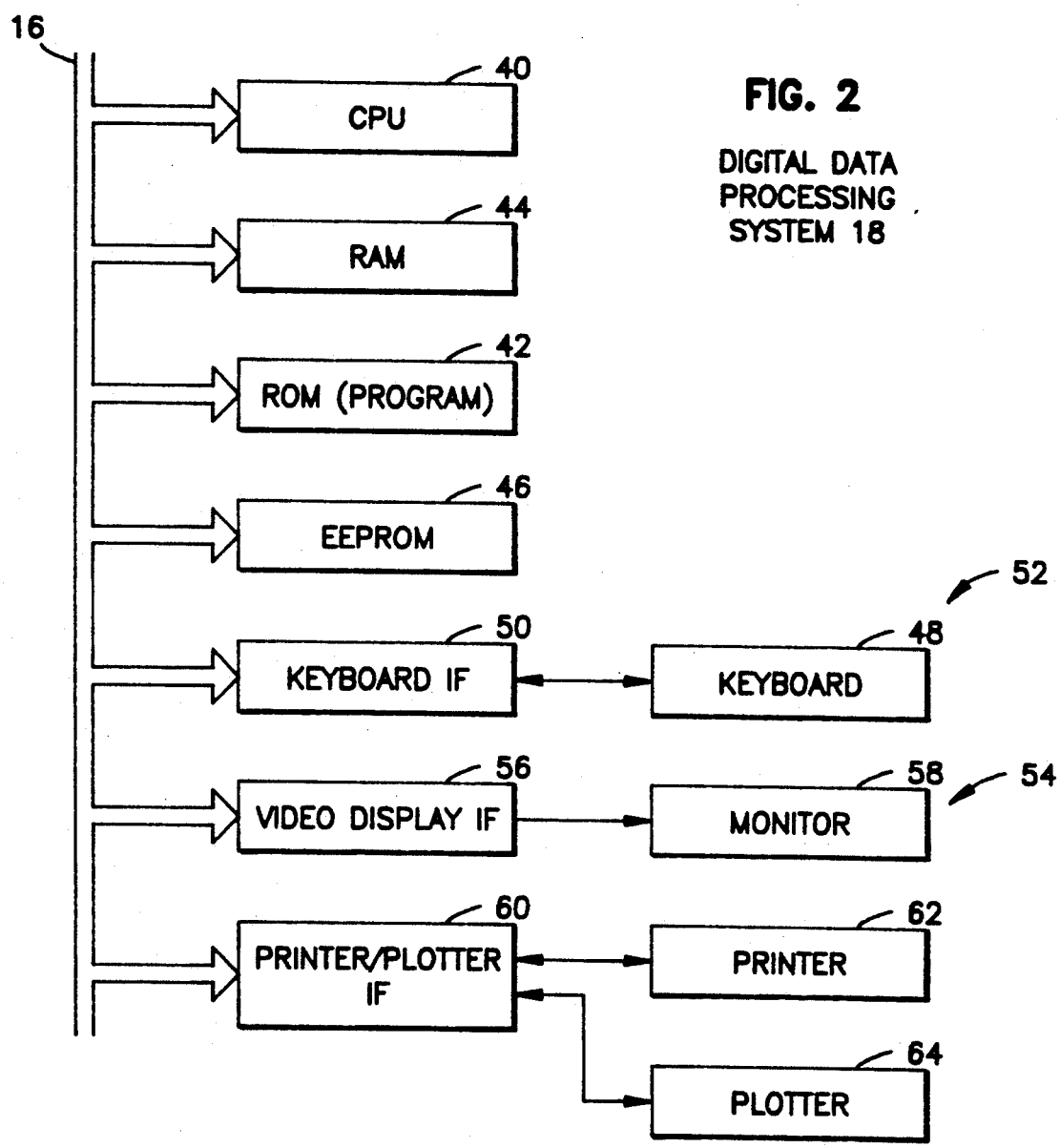
FIG. 2 is a block diagram representation of a digital data processing system used in the servovalve analyzer system shown in FIG. 1.

Making further reference now to FIG. 2, there is shown in greater detail the digital data processing system 12 which includes several conventional components which are interconnected by the digital data bus 16. A central processing unit 40 operates under control of a program stored in a read only memory 42 to provide master control over the sequencing and operation of the servovalve analyzer system 10. A volatile random access memory 44 provides temporary storage for variable data while an electrically erasable programmable read only memory (EEPROM) 46 stores tabular data that is representative of the characteristics of transducers, amplifiers, units to be tested, and test definitions for units to be tested. The system stores in EEPROM 46 data that is changed from time to time but which must be preserved through system power shut down. It will be appreciated that other types of data storage such as magnetic disk or tape storage could be implemented if desired, but the present arrangement provides an economical arrangement for meeting the minimum data storage requirements of the servo valve analyzer system 10.

A keyboard 48 is coupled through a keyboard interface circuit 50 to the digital data bus 16 to provide an input subsystem for entry of operator generated information and commands into the digital data processing system 12. An output subsystem 54 communicates information from digital data processing system 12 to an operator or others in human understandable form. The output subsystem 54 includes a video display interface circuit 56 driving a video monitor 58 as well as a printer/plotter interface circuit 60 connected to a printer 62 and a plotter 64. It will be recognized that any of a variety of conventional output modules may be added to or deleted from the output subsystem 54 as required for a particular test environment.

Figure 3A:
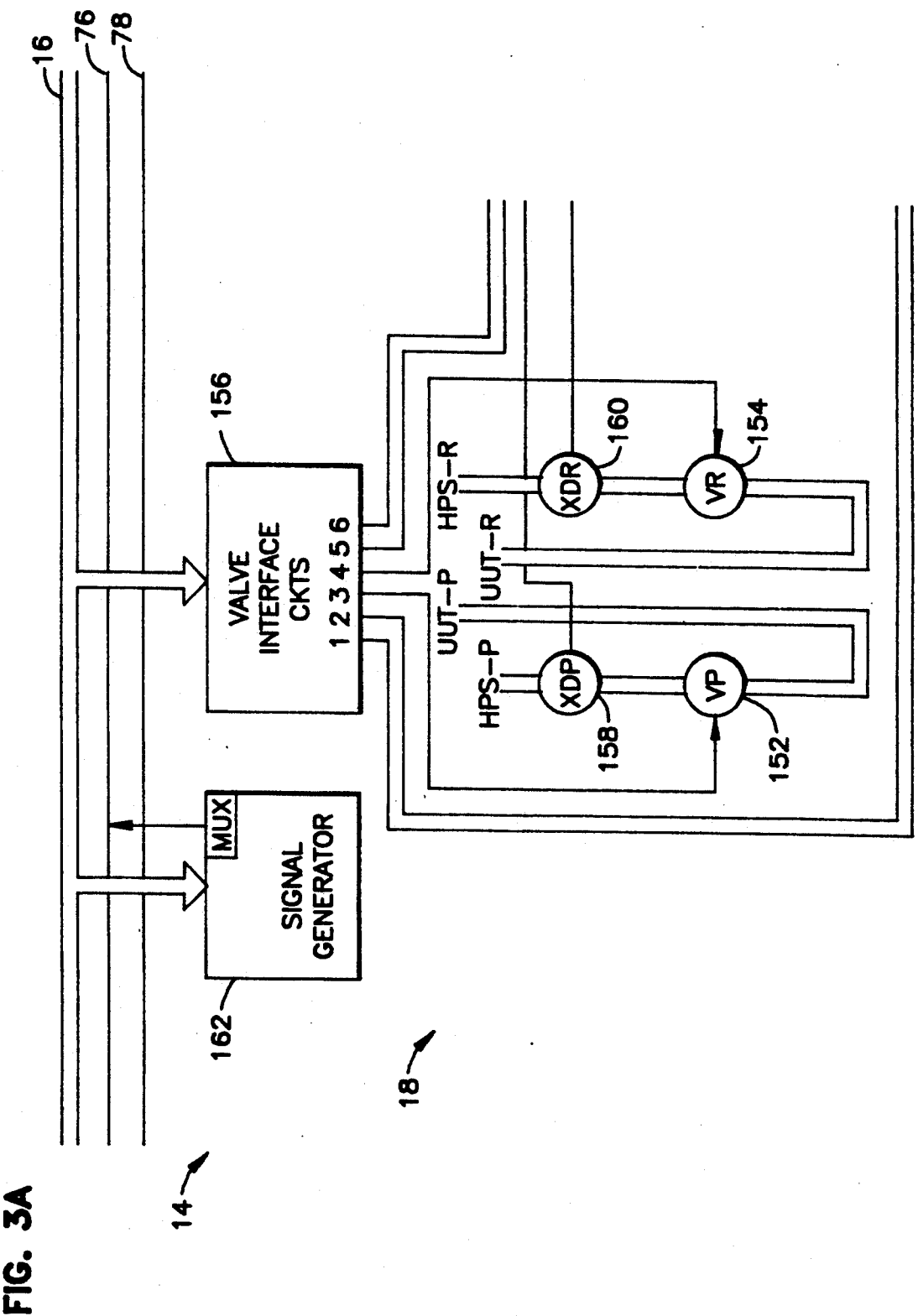
FIG. 3 is comprised of parts 3A, 3B, 3C, and 3D and is a block diagram representation of a transducer interface system and a transducer system used in the servo valve analyzer circuit shown in FIG. 1.
Figure 3C:
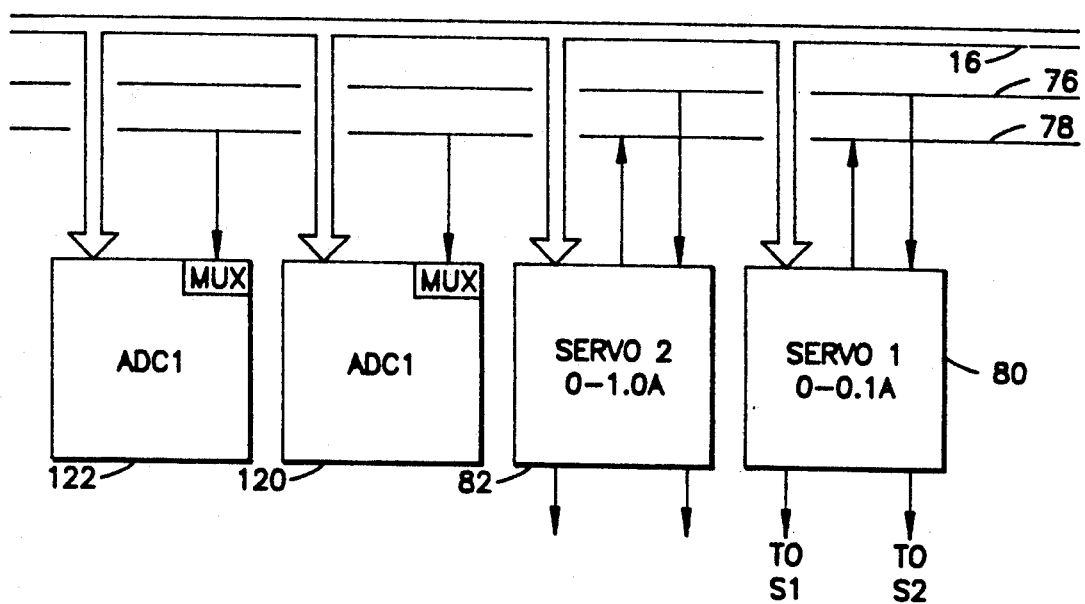

The transducer interface system 14 and transducer system 18 are shown in greater detail in FIGS. 3A, 3B, 3C to which further reference is now made. The digital data bus 16 extends to various components within the transducer interface system 14 while two internal analog buses provide additional communication for analog signals within the transducer interface system 14. The analog buses include an analog command signal bus 76 and an analog input signal bus 78. The analog command signal bus 76 comprises four pairs of conductors and typically carries up to four pairs of differential analog signals. However, whenever required for a particular circumstance, any of the pairs of conductors may be allocated to unrelated single ended signals.

The analog input signal bus 78 carries 32 pairs of differential signal conductors Each of these pairs is dedicated to a particular transducer channel at the time of manufacture. The application program is compiled at the time of manufacture using parameters which define components that are to be connected to the channel. These dedicated components can thus be changed by recompiling and reinstalling the program if necessary, but such changes are not contemplated for normal operation.

It will be appreciated that the transducer interface system 14 is shown as including a particular configuration of components to illustrate a given example of the present invention. However, additional interface components may be added as necessary to accommodate specific transducer types and test situations or selectively eliminated for applications where given components are not required.

Among the components of the transducer interface system 14 are two programmable servo amplifiers 80, 82 labeled SERVO1 and SERVO2. By way of example, programmable servo amplifier SERVO1 80 is shown in FIG. 4 in greater detail. An analog command multiplexer and summer 90 is connected to receive signals on each of the eight lines of analog command signal bus 76 as well as data from the digital data bus 16. In response to data appearing on bus 16, analog command multiplexer and summer 90 selectively passes signals on any one or more of the conductors of analog command signal bus 76 and sums the signals that are enabled to produce an output signal which is communicated through a unity gain amplifier 92 to a command attenuator 94. Command attenuator 94 may be advantageously implemented as a multiplying digital to analog converter and selectively attenuates the input signal to provide an attenuated output signal which is communicated through a unity gain amplifier 96 to a summing junction 98.

Command attenuator 94 responds to a ten bit word from digital data bus 16 and thus provides a 1,024 continuous discrete ranges of attenuation going from 0.001 in response to a 0 input to 1.00 in response to an input of 1023.

A second servo amplifier input circuit is substantially identical to the first, except that it is connected to the analog input signal bus 78 instead of the analog command signal bus 76. Signals appearing on the analog input signal bus 78 are selectively communicated through an analog feedback multiplexer and summer 100, an inverting unity gain amplifier 102, a feedback attenuator 104, and a unity gain amplifier 106 to the summing junction 98. Although the second input circuit can be used in other ways, it is intended for use in placing the programmable servo amplifier 80 in a negative feedback loop having a position transducer or other transducer sensing a physical condition that is being controlled in response to the output from amplifier 80. To facilitate the negative feedback loop connection, unity gain amplifier 102 is an inverting amplifier in contrast to the non-inverting configuration of its counterpart 92 in the first input circuit.

A servo amplifier 110 receives an error signal from summing junction 98 and drives its output circuit, which in the present example is connected to UUT excitation coil 26 with a current that is proportional to the received error signal. From the coil 26 the drive current passes through a high precision current sensing resistor 112 to ground. The voltage across the current sensing resistor 112 is coupled back to summing junction 98 so that the error output signal from summing in junction 98 can represent the difference between a received input command from the sum of the outputs from amplifiers 96 and 106 less the feedback signal from current sensor resistor 112. A buffer amplifier 114 is differentially coupled across current sensor resistor 112 to provide an actual current signal selectively through a multiplexer 116 to the analog input signal bus 78 at a selected channel position such as channel 15.

By making a high precision actual drive current signal available to the analog input signal bus 78 and hence the rest of the servo valve analyzer system 10, the system 10 can utilize high precision actual drive current data when analyzing test results. This is somewhat more accurate than would be reliance upon the drive current being exactly equal to a commanded drive current.

The analog buses 76, 78 carry maximum full scale signal amplitudes of + or − five volts which is selectively attenuated by command and feedback attenuators 94, 104 to a maximum signal range varying from + or − five millivolts to + or − five volts at the unity gain amplifiers 96, 106. Programmable servo amplifier 80 is capable of generating a maximum, full scale output current of 100 milliamps (0.1 amp) in response to a maximum input signal from the analog bus with no attenuation from the appropriate command attenuator 94, 104. However, when an active attenuator 94, or 104 is set for maximum attenuation in response to a command of 0, the voltage at amplifier 96 or 106 has a maximum range of + or − five millivolts and the output current from programmable servo amplifier 80 has a maximum range of + or − 0.1 milliamp. This selective control over the maximum output signal range is useful for adapting to different drive current resolution when testing different UUTs with different excitation requirements.

While other configurations are possible, the analog command multiplexer and summer 90 is typically connected to a primary digital to analog converter through pair zero of the analog command signal bus 76. It is connected to a signal generator on pair one of the bus, to an offset digital to analog converter on pair two of the bus and to any desired auxiliary signal on pair four of the bus. Use of this standardized connection configuration helps promote system uniformity and reduce connection errors although other configurations could be used as well.

The programmable servo amplifier SERVO2 82 is substantially identical to amplifier 80 except that it is intended for driving UUT's with larger full scale drive current requirements and therefore provides a maximum output drive current of 1.0 amp instead of 100 milliamps.

Referring again to FIG. 3, the transducer interface system 14 also includes two analog to digital converters 120, 122 respectfully designated ADC1 and ADC2 which are coupled to receive analog signals from respectively channels 0-15 and 16-31 of the analog input signal bus 78 and provide them to the digital data bus 16 in digital form. Two digital to analog converters 124, 126 are designated respectively DAC1 and DAC2 and are connected to receive digital signals from the digital data bus 16 and convert them to analog signals which are provided to a selected conductor pair of the analog command signal bus 76 through a suitable multiplexer which is responsive to bus selection signals provided over digital data bus 16.

Although not explicitly discussed for each different component of the transducer interface system 14, it will be appreciated that each connection to one of the channels of analog command signal bus 76 is through a multiplexer arrangement which permits connection to selected ones of the four pairs of analog bus signals.

Two analog signal conditioning circuits 130, 132 each include four individual signal conditioning circuits designated respectively C11 through C14 and C21 through C24 which are each coupled to a dedicated channel of the analog input signal bus 78 which is selected at the time of manufacture of system 10. In a preferred embodiment the transducer interface system 14 accommodates up to 4 circuit boards with up to 8 individual signal conditioning circuits on each board. Fewer signal conditioning circuits are used in the present example to simplify the explanation. Each of the conditioning circuits C11–C24 provides conditioning and amplification of transducer signals such that a connected maximum amplitude transducer signal approaches the maximum + or − five volt signal amplitude allowed on the analog input signal bus 78.

For illustrative purposes a position transducer PT1 138 is shown connected to a conditioner C21 within signal conditioning circuit 132 while a strain gauge transducer SG1 140 is shown connected to a conditioner C14 within signal conditioning circuit 130. Because of the extremely low output signal level from strain gauge transducer 140, conditioner C14 must be a strain gauge bridge circuit conditioner having a high degree of sensitivity and a large amplification.

Transducers within the transducer system 18 include a pressure transducer AC1 142 which is hydraulically coupled to monitor pressure at the C1 port of UUT 24. The signal from pressure transducer 142 is coupled through signal conditioner C12 to the analog input signal bus 78. Similarly, a pressure transducer AC2 144 is hydraulically connected to monitor pressure at the C2 port of UUT 24 and its signal is selectively coupled through signal conditioners C11 and to the analog input signal bus 78. Two flow rate transducers 146, 164 are coupled in the hydraulic flow path between ports C1 and C2 of UUT 24 and are designated Q2C and Q504. Flow rate transducer 146 is used for static flow conditions and provides an output signal which is coupled through signal conditioner C13 and to the analog input signal bus 78. A flow rate transducer Q504 164 is used for dynamic testing conditions. A pair of Y valves 166, 168 are selectively switched simultaneously by processor commands issued through valve interface circuits to direct fluid flow alternately through transducer Q2C 146 or transducer Q504 164 as required for a particular test sequence. It will be appreciated that the signal outputs from the transducers 142, 144, 146, 164 may be selectively coupled through the analog input signal bus 78 to one of the analog to digital converters 120, 122 to make the information available to digital data bus 16 and hence the digital data processing system 12 for analysis of test data.

Two shut off valves, valve V1 148 and valve V2 150 may be arranged for manual operation or alternatively, for fully automatic operation, may be coupled through a part of valve interface circuit 156 to receive open and close commands over the digital data bus 16. The valves V1 and V2 may be selectively opened and closed during a testing procedure to permit pressure transducers 142 and 144 to provide pressure data for ports C1 and C2 of UUT 24 under zero flow conditions. Shut off valves VP 152 and VR 154 are coupled respectively in the hydraulic flow paths for the pressure and return ports of hydraulic power source 28. As with valves V1 148 and V2 150, these valves may be manually controlled, but in the present example are connected through valve interface circuits 156 to digital data bus 16 so that data processing system 12 may provide commands over bus 16 to control the opening and closure of valves 152, 154. Two pressure transducers XDP 158 and XDR 160 are provided to monitor the pressure at the P and R ports respectively of hydraulic power source 28 and have outputs which are coupled through signal conditioners C23 and C24 to the analog input signal bus 78.

A signal generator 162 which is designated SIGNAL GENERATOR responds to command signals received over digital data bus 16 to provide selected periodic signal wave forms such as triangular saw tooth or sinusoidal waves. The output signal may be varied in frequency from 0.0006 Hz to 16,000 Hz and may be varied in peak amplitude from 0 to + or − five volts. Signal generator 162 is useful in providing control signals which may be utilized for dynamic or time varying testing of certain servo valves.

Figure 5:
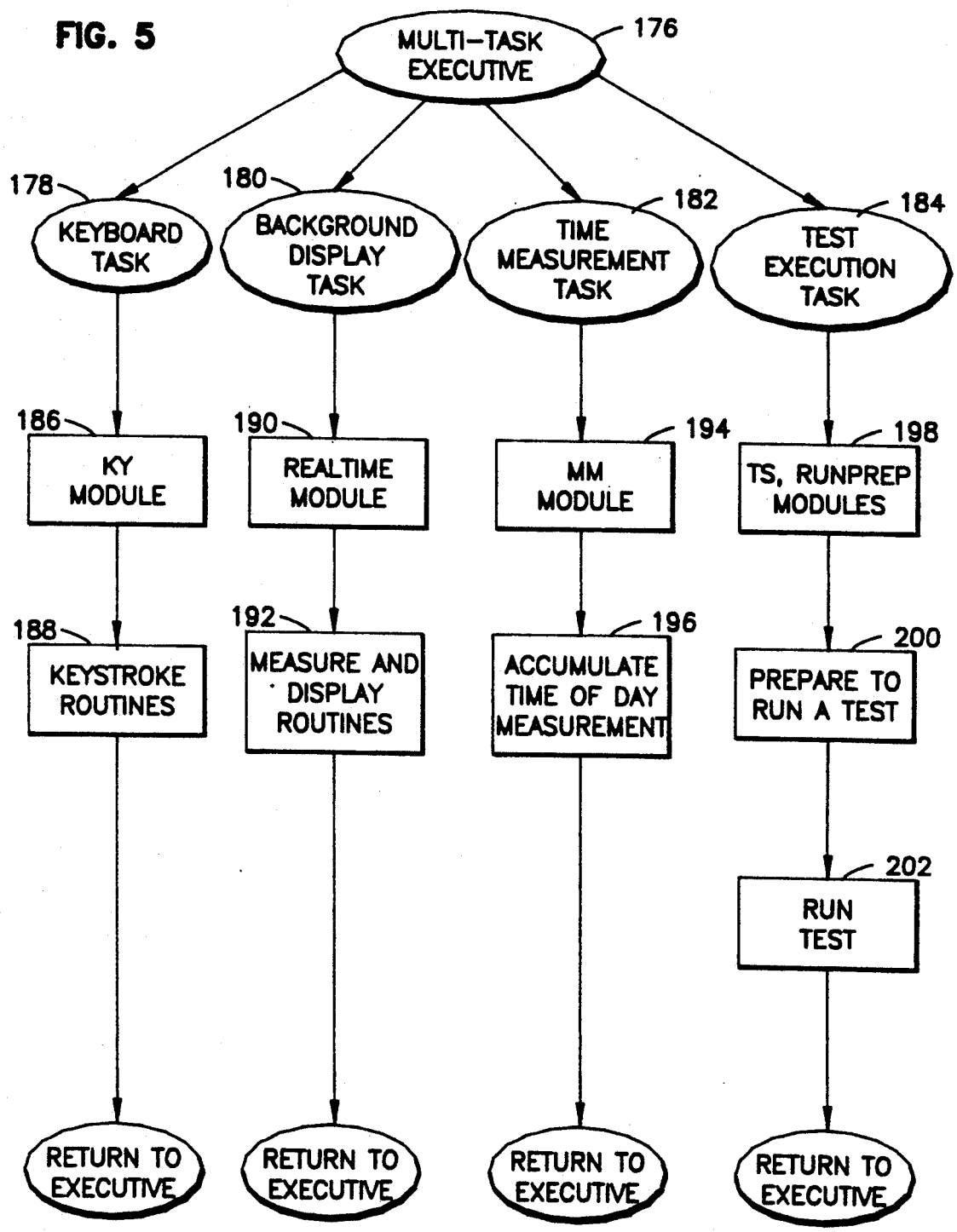
FIG. 5 is a general flow diagram illustrating the program structure for the servovalve analyzer system shown in FIG. 1.

A structural representation of the program stored in ROM 42 is represented by a general flow diagram shown in FIG. 5. A multi-task executive 176 reviews a task list on a fixed time interval to determine whether any tasks are active and branches to those that are active on a sequential basis. Each task determines when and for how long control is returned to the executive. The list of tasks includes a key board task 178, a background display task 180, a time measurement task 182, and a test execution task 184.

The keyboard task provides the entry port for alteration of servo analyzer states by an operator. It includes a KY module 186 which monitors keyboard actuation and a set of key stroke routines designated module 188 which respond to key stroke commands in accordance with a current state of the system 10 and the particular keys which are actuated. Servo analyzer states may thus be altered by an operator through commands entered through the keyboard.

Included within the background display task 180 are a real time module 190 which operates during test execution procedures to monitor current system conditions and in response thereto calls measure and display routines 192 which cause the display of appropriate status messages, error messages, menus, or data entry messages on the video monitor 58 as required by background functions during system operation.

The time measurement task 182 includes an MM module 194 which monitors ticks of a periodic clock signal and responsively calls an accumulate time of day measurement module 196 which maintains current time of day and calendar information for the system 10. This task also provides time interval measurement or delay functions for other program procedures.

The primary test and analysis application tasks are performed by a test execution task 184 which includes test system modules, TS, run prep modules 198 which establish and maintain in EEPROM 46 tables of data identifying physical characteristics of the various components and UUT's available to the analyzer system 10 as well as the test definition tables. The test execution task 184 also includes a prepare to run a test module 200 which provides operator guidance for hydraulic and electrical connection of a unit under test and selection of proper test conditions in preparation for an actual test procedure. A run test module 202 performs the actual test sequences defined by test data stored in EEPROM 46, analyzes the , test data and outputs the test data in human understandable form through a suitable output device such as the plotter 64.

Figure 6:
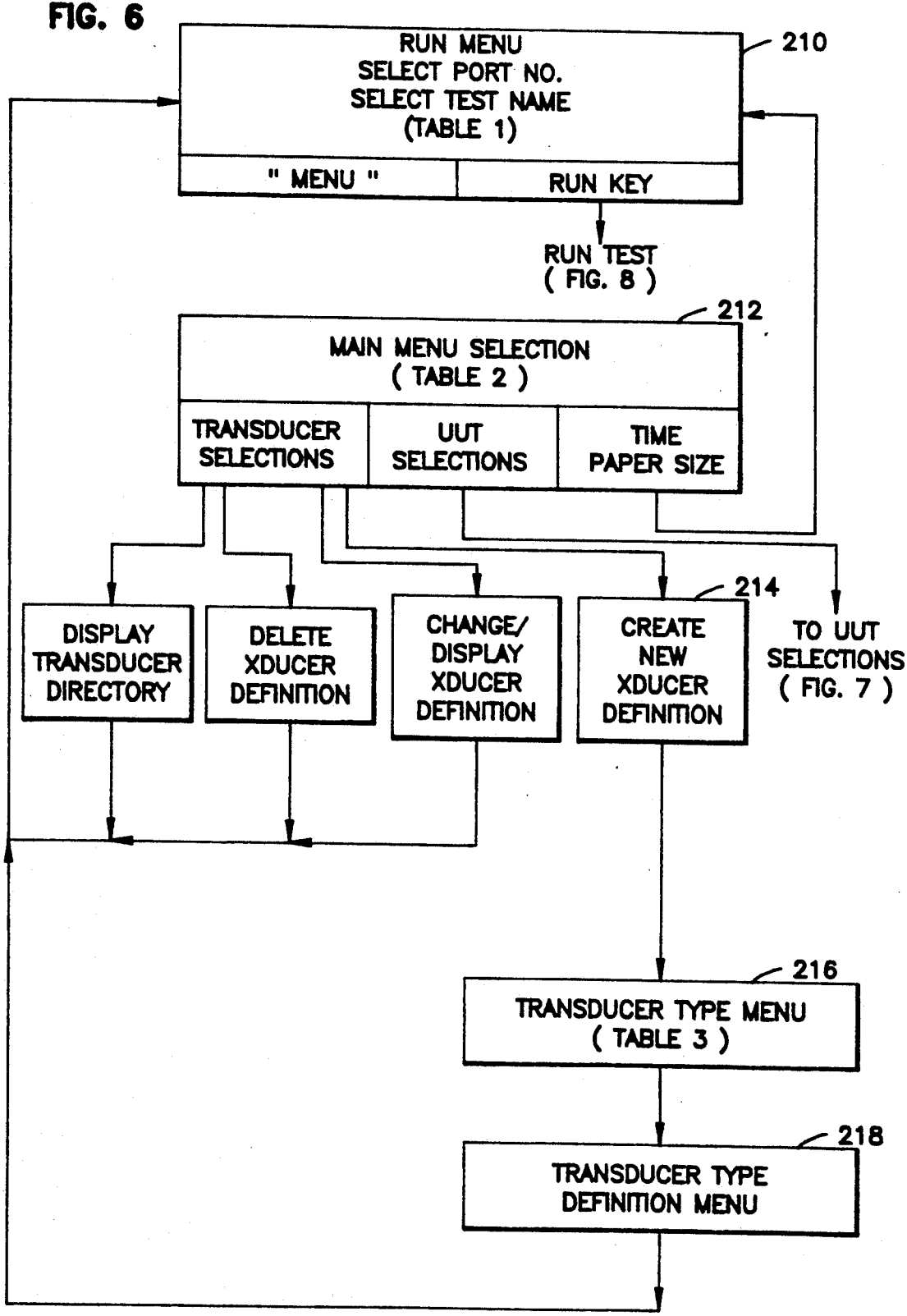
FIG. 6 is a flow chart illustrating a portion of the program for the analyzer system shown in FIG. 1.

Having described generally in conjunction with FIG. 5 the structural relationship of the program tasks, the test execution application program will be described from a functional, operator view point. Referring now to FIG. 6, when the system 10 is first turned on or initialized, the operator is presented on the video monitor 58 with a run menu as shown in FIG. 6 and Table 1. After all identification of transducers, test units and tasks which are required to test a given unit have been completed by the operator, the operator enters the part number or name for the unit to be tested and then actuates the run key to initiate testing. However, before a test can be successfully run, all required component definitions must first be entered and the description will begin with this procedure.

To switch to the main selection menu the operator presses the MENU key, and is presented with the main selection menu 212. The run menu 210 is illustrated in Table 1 while the main menu selection is presented in Table 2. It will be observed from Table 2 that the operator is presented with five selections relating to UUT definitions, four selections relating to transducer definitions, an enter time of day selection and a select plot paper size selection. The entered time of day selection merely presents a menu which enables the operator to change the current date and time for the calendar/time function of the system 10. The select plot paper size causes presentation of a menu which allows the operator to select between a large or a small size of paper for recording of output analysis data by the plotter 64. A particular entry is selected by using the keyboard cursor keys to move the cursor to one of the menu items and selecting that menu item by pressing the RETURN key.

Within the transducer group of items is a display transducer directory selection. The system responds to this selection by displaying a directory list containing the names of all previously defined transducers. The delete a transducer definition prompts for the name of an existing transducer definition and then deletes the corresponding definition. Change/display a transducer definition prompts for the name of an existing transducer and then presents the previously selected definition data relating to that transducer. Any selected definition can be changed by moving the cursor to the desired definition and typing in a different definition using the conventional edit keys.

If the operator elects to create a new transducer definition as indicated by block 214 the operator is presented with a transducer type menu 216 which is illustrated in greater detail in Table 3. Table 3 lists all of the different types of transducers which are available for use in conjunction with the system 10. The last three items, the servo amplifier, signal generator, and analog to digital converter are not actually measuring devices but are system components which are included in the transducer list for convenience to enable them to be defined and calibrated using the same software procedures as for the measurement transducers. Upon selecting a given transducer type, the operator is presented with a corresponding transducer type definition menu 218 which enables the operator to enter all data required to define the selected type of transducer. The menu items are illustrated in greater detail for a first example in Table 4A. Table 4A shows a transducer definition menu for a pressure transducer which is a relatively linear device and requires only full scale and offset calibration entries. Upon presentation of the menu, the operator types in the device name. For example, if the transducer is to be used to measure a supply pressure for test procedure A, the name might be supply A as shown in Table 4A. Next, an analog channel number between 0 and 31 must be entered to identify the physical connection of the transducer to a particular signal conditioner within signal conditioning circuits 130, 132. The selected signal conditioner must of course accommodate the output signal levels of the transducer.

In this case channel 0 is entered which would correspond to signal conditioner C11 as shown in FIG. 3. Next, the units of transducer measurement are entered which are PSIG in this case. Selection of the measurement units is followed by entry of the maximum full scale measurement value for the transducer in the given units and entry of a calibration date.

Calibration can then be performed in one of two ways. If automatic calibration by the system 10 is not desired, the operator simply enters 0 for the full scale entry and near zero entry values and the system proceeds to enter 0 for the calibrated full scale and calibrated offset values. The system then assumes that the sensed transducer values actually represent the actual physical condition being sensed and provide no calibration offset or scaling. The operator can then do a manual calibration by subjecting the transducer to a near 0 environment, meaning atmospheric pressure in the present instance and adjusting an offset potentiometer on the corresponding signal conditioning amplifier, which in this case is C11. Next, the transducer is presented with a known pressure which is preferably close to full scale pressure and a full scale potentiometer on the signal conditioning circuit C11 is adjusted until the output signal correctly represents the measured value. This is a common prior art calibration technique and in effect creates a fixed, one to one relationship between the transducer and the signal conditioner to which it is connected. While other transducers can be connected to the same signal conditioner, care must be taken to assure that the two potentiometer settings are properly adjusted whenever the transducer SUPPLYA is connected thereto.

Alternatively, the system 10 can perform an automatic software calibration for which the data is stored and reused for automatic scale and offset adjustments any time the indicated transducer is used in the system. For example, the transducer is hydraulically connected and subjected to a pressure of 4850 PSIG. This number is entered after the full scale entry of the definition menu and the enter key is pressed. The system 10 detects and temporarily stores the corresponding output from the associated analog to digital converter. Next the operator subjects the transducer to a near 0 condition and enters after the near 0 entry location the actual near 0 condition which in this case is 0.0 PSIG. The system 10 responds by detecting the corresponding output from the associated analog to digital converter and using this value along with the previous temporary near full scale values to calculate offset and full scale values. The calibration is based on the linear equation, $$Y = MX + B \qquad \text{(Eq. 1)}$$

where Y is the actual physical value or corrected measured value, B is a 0 intercept offset value and M is the slope of the relationship between measured and actual values. X is the measured output from the analog to digital converter at a given actual value. After the near 0 and full scale data have been collected the system 10 uses the difference between the operator entered actual near 0 value and the operator entered actual full scale value along with the difference between the analog to digital converter values near zero and full scale to find the value of M as indicated in the equation, $M = $(Actual full scale − Actual near zero)/ (A to D full scale − A to D near zero)

Having found a value for M, a value for B may now be calculated by the following equation.

$$B = (\text{Actual full scale Value}) - M \times (\text{A to D full scale Value}) \quad (\text{Eq. 2})$$

These values of M and B are then stored in the non-volatile storage along with the other transducer definition data for future use anytime this transducer is utilized in a test procedure. In the present instance a calibrated full scale value of 4,986 corresponds to a full scale transducer input of 5,000 PSIG and represents only a small deviation from the actual input pressure. It will be appreciated that the stored slope and offset values will be utilized to correct for this small variation when the transducer is actually used.

In a second example of a transducer definition a flow transducer is utilized as the example as illustrated in Table 4B. In this case the operator enters the transducer name, assigned analog channel, units of measurement, full scale value, and calibration date as with the pressure transducer. However, the flow transducer is known to have a relatively non-linear output relationship with respect to sensed flow conditions and thus in lieu of the simple 2 point calibration utilized for the pressure type of transducer, a multi-point calibration is accommodated for the flow type of transducer.

To facilitate the multi-point calibration, the operator must indicate a number of points which is greater than 2 (in this case 10) and then proceeds to establish the physical condition and indicate the condition for each of the indicated number of points The points can begin with negative values but for simplicity, must appear in ascending order and must at all times lie between the negative and positive full scale values indicated for the transducer. In the present instance the operator subjects the transducer to a known flow rate of 0.105 gallons per minute and enters this value on the appropriate line 1 of the multi-point calibration table. The system 10 responds by detecting, storing and displaying the corresponding analog to digital converter output reading which in this case is 4.0. The operator then sets up the applied stimulus of 0.200 gallons per minute for the next point and enters this value into the table. The system again responds by indicating the corresponding analog to digital converter output reading of 17. this procedure then continues until data has been entered for each of the points 1 through 10. This data is then stored in the non-volatile store along with the other transducer definition data for the named transducer.

When the transducer is later used in a test, corrected values are obtained by using linear interpolation between test points in the calibration table. For data points smaller than point one in the table (0.105 GPM), a linear segment is established between points 1 and 2 and extended for a straight line extrapolation to the required data point. Similarly, for data points beyond point 10 in the table, a straight line segment is established between points 9 and 10 and extrapolated to the detected data point. While a transducer definition menu has not been described herein for each possible type of transducer, the two examples represented by Table 4A and 4B are representative of the procedures involved and these procedures can be extended to the other types of transducers. After a selected transducer has been defined at 218, program control is returned to the initial run menu.

Figure 7:
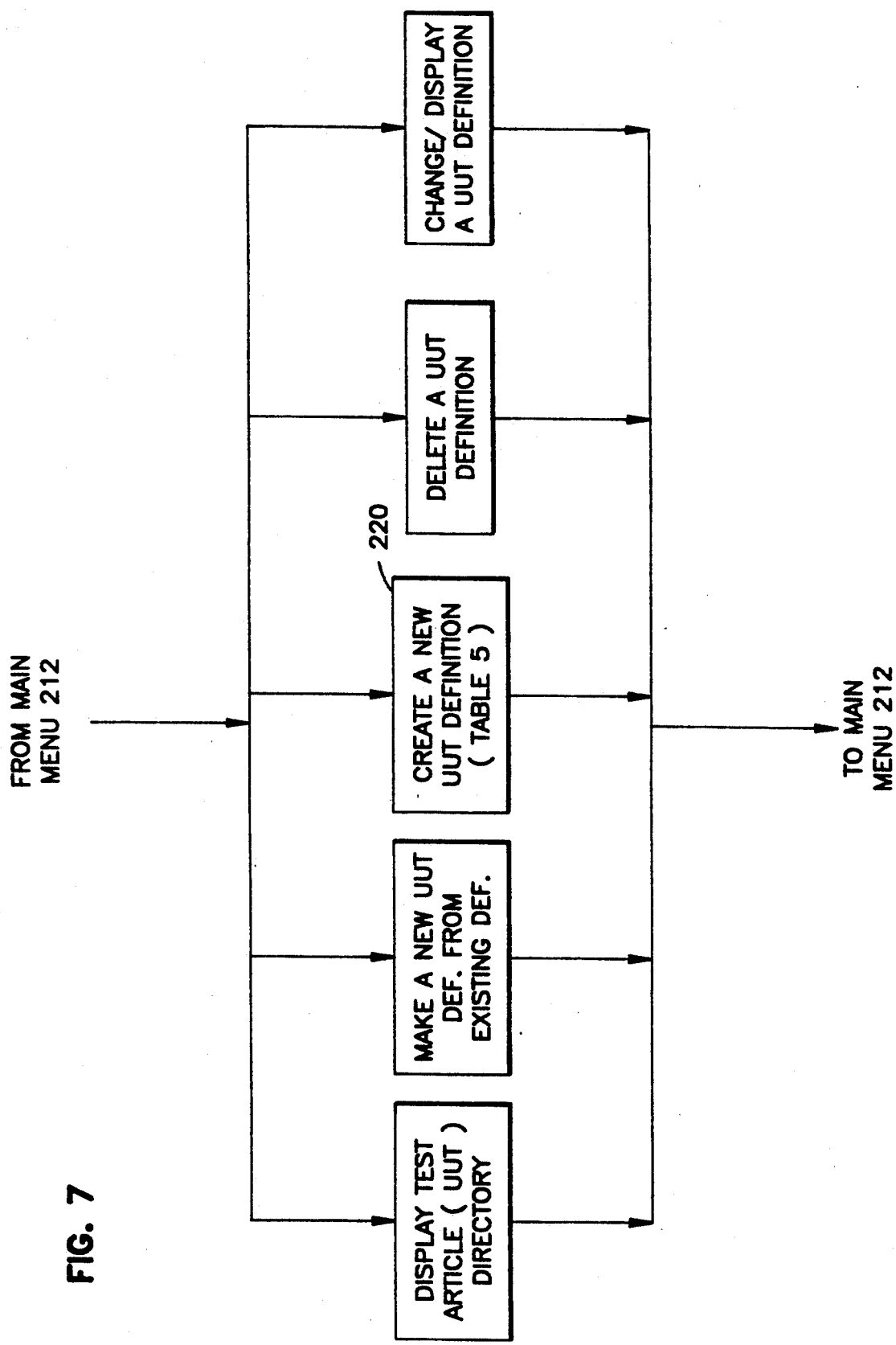
FIG. 7 is a flow chart illustrating a portion of the program for the analyzer system shown in FIG. 1.

Referring to FIG. 6, if at main menu selection point 212 the operator selects one of the UUT selection options, control is transferred to UUT selection options as illustrated in FIG. 7.

Most of the UUT menu selection options illustrated in Table 2 have a direct correspondence to the transducer selection options which have been previously described. The one exception is to make a new UUT definition from an existing definition option which is provided as an operator convenience in view of the more complicated nature of the UUT definitions. This option enables the operator to start with a prior UUT definition, change the name, and then change any other definition parameters which may be required. It will be appreciated that to facilitate use of the same transducer in different applications, different definition tables can be provided for the same transducer. The ability to create a new UUT definition from an old UUT definition is particularly advantageous for different model variations of a single product line where only one or two table definition table entries vary between the different models.

The requirements for defining a test article or UUT will become apparent by considering an example wherein the operator elects simply to create a new UUT definition as indicated at block 220. A UUT definition requires several screens of data items and these items are listed in Table 5 in sequence. For convenience of illustration, Table 5 shows the definition of two UUTs, designated UUTA and UUTB in parallel in order to demonstrate a variety of UUT definitions. However, it should be appreciated that in actual use only one UUT is defined at a time.

In defining a unit under test the operator is shown a list of all of the test unit characteristic definitions that must be provided. The list begins with the name, and for the present parallel examples the names UUTA and UUTB have been selected. Next, for UUTA the flow volume units are entered as cubic inches and the flow time units is entered as seconds. Similarly, for UUTB the flow volume units are entered as gallons and the flow time is entered as minutes. The rated current units is next entered as amperes for UUTA and milliamperes for UUTB. The next items to be entered are rated flow and rated current which represent the nominal maximum flow and current magnitudes for the UUT and are entered in the previously defined rated units. For UUTA the rated flow is 1.0 cubic inches per second with a rated current of 1.0 ampere. For UUTB the rated flow is 10 gallons per minute with a rated current of 8 milliamperes.

Next the pressure units are defined as PSIG for both units and the rated supply pressure is set at 8,000 PSIG for UUTA and 3,000 PSIG for UUTB. Similarly, the rated return pressures are 50 PSIG for both units. In each instance the rated values imply the maximum nominal magnitude for the defined unit, although the units can usually be driven somewhat above the rated value under some circumstances.

Next, the transducers to be used in testing the units are defined by listing their names. From the present examples, the supply transducers are XDPA and XDPB, the return transducers are XDRA and XDRB, the C1 transducers are AC1 and BC1, and the C2 transducers are AC2 and BC2. From the present example it is presumed that each of these named transducers has been previously defined using the menus and techniques previously described with transducer XDPA being 10,000 PSIG full scale, XDPB being 5,000 PSIG full scale, XDRA being 10,000 PSIG full scale and XDRB being 5,000 PSIG full scale. It is further presumed that transducers AC1 and AC2 are each 10,000 PSIG full scale and transducers BC1 and BC2 have been defined as 5,000 PSIG full scale.

The servo amplifiers which are to be used to actuate the test units are next defined. For unit UUTA servo amplifier SERVO2 having a maximum 1.0 ampere rating is selected while SERVO1 having a maximum current rating of 0.1 ampere is selected for UUTB. This is consistent with the prior definition of UUTA having a 1.0 ampere rated current and UUTB having an 8 milliampere rated current.

Next, a yes or no response must be provided to indicate whether or not filtering of the output test data is desired. Filtering is selected for both units in the present instance. When filtering is enabled a simple 5 point linear smoothing operation is applied to both the set of original excitation data points and the response data points for a test. This filtering primarily eliminates the effects of noise induced disturbances.

The next option is definition of the quarter cycle time and slow cycle time as eight seconds and forty-five seconds for unit UUTA and ten seconds and twenty seconds for unit UUTB. It is noted that these times are defined in seconds even though the flow time units for unit UUTB are minutes. The quarter cycle time controls the data collection rate in the flow gain, threshold, and resolution test. The entered value is that time which is used for collection of $\frac{1}{4}$ of the full cycle of data (e.g., 0 to rated current in the flow gain test). The variety of servovalve flow ratings combined with the available measurement resources in a particular application require that the timing be adjusted to match the valve to the hydraulic environment for optimum performance. In the case of the flow gain test, optimum performance means running the test slowly enough to avoid dynamic effects without running so slowly that test times become inconveniently long. With the quarter cycle time defined in the UUT definition, the optimum time for a particular UUT operating in a particular hydraulic environment can be determined experimentally and that value can then be used for all subsequent testing of that UUT. This is particularly useful in a production environment.

In a practical situation, where it is desired to test servovalves as rapidly as possible while still obtaining accurate data, the operator would first test a servovalve at a conservative, relatively low rate to obtain a reference set of output data. The testing rate would then be successively increased until the point was found where dynamic testing effects begin to affect the output data. For production purposes, the quarter cycle time would then be set at the smallest value which avoids disturbances in the output data from dynamic effects.

The slow cycle time entry is used for controlling data collection rates in all blocked port tests such as pressure gain, null bias, null shift and internal leakage. A slower time is typically used for these tests because the available flow for charging or discharging control point hydraulic compliance is considerably smaller in the blocked port condition than in the normal flow condition. This is particularly true in the vicinity of null. The optimum time for a production environment would be experimentally determined as the fastest cycle time which avoided the influence of dynamic effects as previously described for the quarter cycle time determination.

So far, the table definition entries have provided a general definition for each of the UUTs which may be utilized for controlling and analyzing any of a number of selected test procedures. At this point the operator is prompted to indicate whether particular tests are to be performed and if they are, to enter characteristic data that is associated with the particular test. For the present example it is indicated that the flow gain test is to be performed for both units and the flow transducer is named as Q2C for the unit A and Q12G for unit B. For each unit the flow gain test is to include hysteresis analysis, non-linearity analysis, asymmetry analysis, and saturation analysis The total number of test points is set at 576 for unit A and 480 for unit B.

The flow gain transducers are different for the two test units because of the difference in flow rates. The full scale capability for transducer Q2C is assumed to be 2 cubic inches per second while transducer Q12G has a full scale flow rate of 12 gallons per minute It would be possible to test unit UUTA using transducer Q12G, but the signal quality would be poor in the test range for unit UUTA.

Next, the operator is permitted to enter up to five specific test points for the flow rate test. The test points are entered as a percentage of rated flow rate and must be entered in ascending order. Any zero values are ignored The preset points enable the operator to select specific points of interest that are to be tested. For example, a specification for a given model may require test analysis at a specific flow rate such as 20%. If the specific flow rate were not defined the test program might for example test flow rates of 18% and 22% but not actually test the 20% point.

Next, a null shift test is requested for both units although return pressure null shift testing is disabled for UUTA by specifying both return values as 0.

Continuing with Table 5 it is noted that a null area flow gain test is requested for both units. This is a flow gain test concentrated in the null region for the unit under test. For both units the same transducer is utilized for both the flow gain test and the null area flow gain test, which is Q2C for UUTA and Q12G for UUTB. Lap analysis is requested for unit B but not for unit A. Lap analysis is an analysis of flow shut off conditions for ports C1 and C2. Lap analysis determines if there is a current drive region wherein both ports are shut off or whether one port shuts off or reverses flow at a slightly different point than the other.

A threshold test is requested for unit A and a resolution test is not requested for each unit. For unit A transducer Q2C which is used for the flow gain test is specified as the test transducer. Since neither test is implemented for unit B, no transducer need be specified.

An internal leakage test is specified for both units and the same Q2C transducer is utilized for UUTA as was used for the flow rate test. However, for UUTB, it is desired to have the internal leakage rating expressed in CC per minute rather than gallons per minute as was defined for the original transducer, Q12G. A new transducer definition, Q2000CC is therefore listed for the internal leakage flow transducer for UUTB. This could in actuality be a second definition for the same transducer as Q12G and it would therefore not be necessary to make any changes in the actual hydraulic connections in order to perform this test. A pressure gain test as well as polarity analysis and null pressure analysis is requested for each test unit.

The flush and bleed test is indicated for UUTB but not for UUTA. The flush and bleed test for unit B is defined to operate with a flush frequency of 2.0 HZ, a flush amplitude of 100%, and a flush duration of 5.0 minutes. A pressure test is requested for both units with zero drive current applied. For UUTA the supply proof pressure is specified at 10,000 PSIG while the return proof pressure is specified at 3,000 PSIG. The corresponding supply and return proof pressures are 4,500 PSIG and 3,000 PSIG respectively for UUTB.

A dynamic response test is requested for both units and for UUTA a dynamic actuator transducer name is specified as Q504 while the name is specified as Q506 for UUTB. The operator is then presented with an option to select dynamic response preset points and fourteen are selected for both units in the present example. This is number may range between 0 and 20. All nonzero frequency values entered are used in the dynamic response test provided that they occur within the range specified by the sweep start and sweep end frequencies. For unit UUTA the peak current amplitude is specified as 25% of rated current and the sweep range is defined between 0.5 Hz and 400.0 Hz. For unit UUTB the peak current amplitude is defined as 10% of rated current and the sweep frequency ranges between 2.0 Hz and 200.0 Hz.

In the present example, the shut-off valve 152, 154, 148, 150 and Y valve 166, 168 are defined by the source code before the control program for system 10 is compiled for each different test procedure and hence become semi-permanently defined for the system 10 at the time of manufacture. The control program could of course be modified, recompiled and reinstalled at a later date, but this would be a serious inconvenience for the system user and is not contemplated for normal circumstances. Alternatively, each of the shut-off and Y valves can be manually controllable. This of course has the disadvantage of requiring operator intervention to properly set each of the valves prior to the start of each different test in a sequence of servovalve tests.

However, in an alternative arrangement, the definition parameters for each specified test in a UUT definition includes valve setting definitions as set forth in Table 6. For example, in the present example for both UUTA and UUTB the supply and return valves 152, 154 are to be opened for a given test procedure as are the C1 and C2 shut-off valves 148, 150. For the given procedure, the Y valves are to be in position A for unit A and in position B for unit B. In this alternative arrangement the valve position data is thus included in the UUT definition characteristics and may be utilized by the data processing system 12 to command valve interface circuits 156 to set the valves to the predefined position prior to the initiation of each test procedure.

Figure 8:
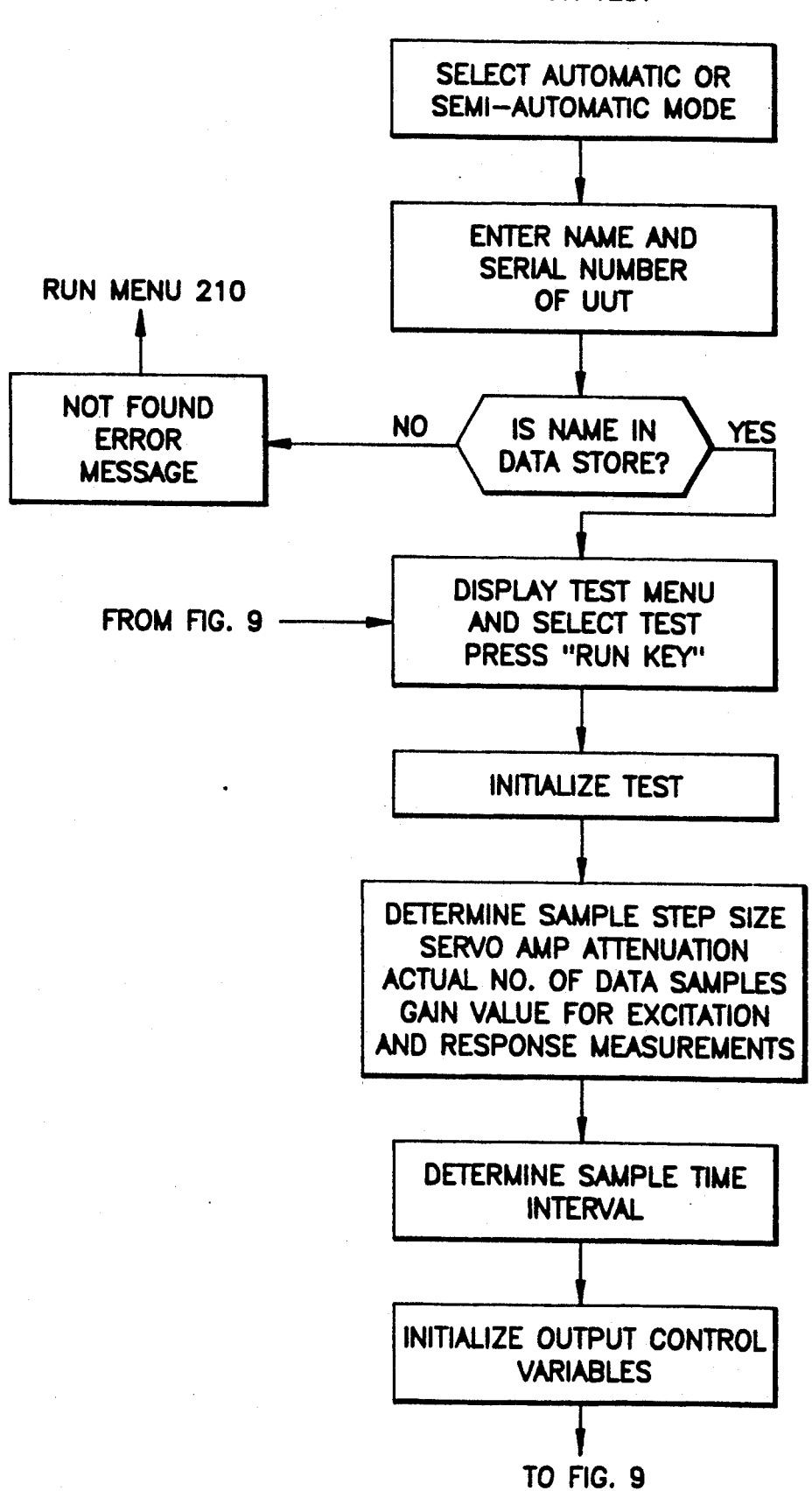
FIG. 8 is a flow chart illustrating a portion of the program for the analyzer system shown in FIG. 1.
Figure 9:
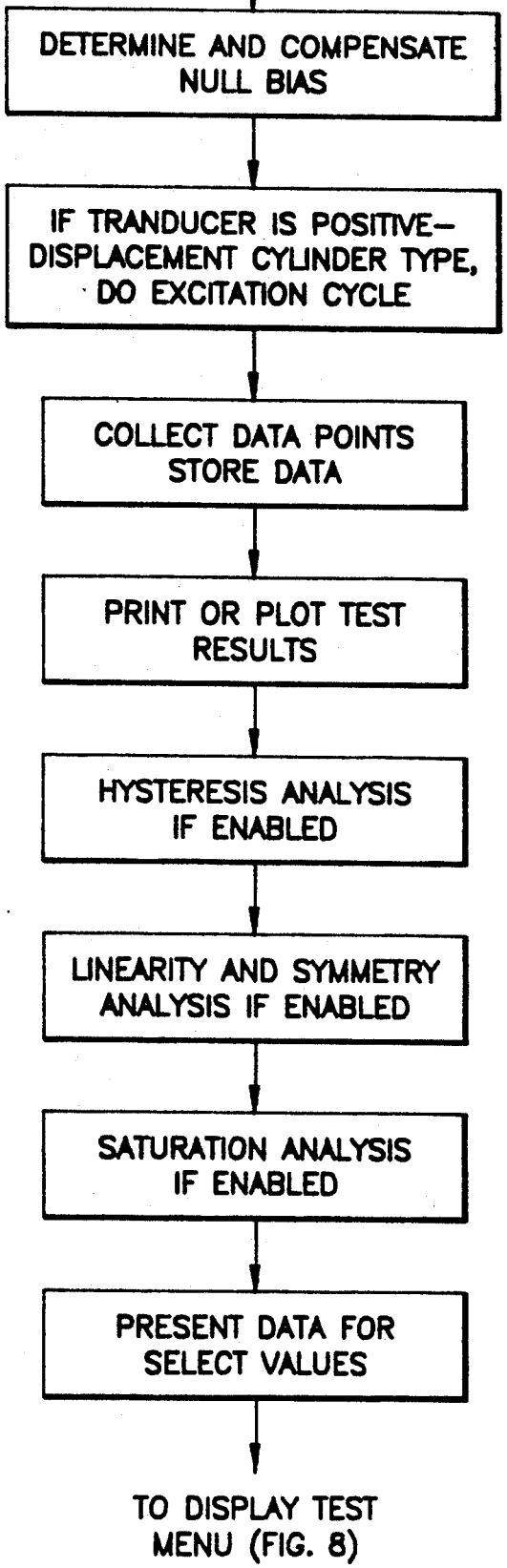
FIG. 9 is a flow chart illustrating a portion of the program for the analyzer system shown in FIG. 1.

Returning again to FIG. 6, if at initial presentation of the initial run menu 210 the operator elects to actuate the run key, a run test procedure begins as illustrated in further detail in FIG. 8. The operator is first prompted to select either a semi-automatic mode wherein the program pauses between test procedures to allow an operator to manually change hydraulic connections and valve settings and select or reject the next test and between a fully automatic mode wherein all of the defined tests for a UUT name are executed in sequence. In the automatic mode, the system 10 automatically sets the valves to the required position with digital command executed through the valve interface circuits 156. For the present example it will be assumed that semi-automatic operation has been selected.

The operator is next prompted to enter the name and serial number of the unit to be tested. The name identifies the type of unit and creates an association with a previously stored table of UUT characteristics defining the nature of the test unit and the specific tests which are to be conducted as discussed previously. When the name and serial number have been entered the data processing system 12 searches the directory of defined UUTs. If not found, an appropriate error message is displayed and program control returns to the main run menu 210. The serial number of the UUT is saved and printed with the output data to assure that the output analysis data can be matched with the exact servovalve that is being tested.

Assuming that the entered UUT name is verified as valid by its presence in the directory of UUT names, the operator is presented with the menu listing all of the tests which have been defined and enabled for the UUT name and is prompted to select one of the tests by either placing the cursor on the test name and pressing the enter key or by typing the name of the test. After a valid test such as the flow gain test has been correctly selected, the run key is pressed and the test execution sequence for the selected test begins.

Several initialization operations are now performed by the run prep module within the test execution task 184 (FIG. 5). The indicated UUT definition table is transferred from EEPROM 46 to RAM 44 and it is then scanned to determine the names of the several basic transducers to be used and the name of the servo amplifier that is to be used in testing the specified unit. The transducer definition tables associated with the named transducers are then transferred from EEPROM 46 to RAM 44. There is an index number associated with each type of test and the index number associated with the selected test is then used to further prepare the test for execution by transferring the transducer definition table for the test specific transducer (the specified flow measurement transducer in the present example) into RAM. In addition, a unique real time parameter display for the selected test is initialized and displayed. Finally, the specific test name (flow gain) is supplied to the multi-task executive 176 and execution under control of the flow gain test procedure code begins. During test execution the program utilizes the parameters from the UUT definition table and transducer tables which are stored in RAM 44 to determine the characteristics of the test which are programmable or operator selectable.

Next the sample step size for the drive current is determined using the UUT defined rated current, the servo amplifier transducer definition, the number of samples to be taken as indicated by the flow gain test definition and the range of excitation to be used as defined by the flow gain test definition. At the same time the attenuation command for the selected servo amplifier is determined, the actual number of data samples to be taken is determined, and a gain value for excitation and response measurements is determined. In general, a servo amplifier programmable attenuator is commanded to allow only slightly more excitation than is required by the drive current range for the test in order to maximize the resolution of the commanded drive current magnitudes. The measurement gain values are set to provide measurement resolutions of at least twice the excitation resolution whenever possible. The sample step size is set to accurately satisfy the combined requirements of excitation range, desired sample size and maximum digital to analog convertor output.

The time interval for each sample is calculated by dividing the quarter cycle time specified in the UUT definition by one fourth of the sample size. This value is rounded to an integral number of milliseconds.

After the sample time interval is determined the appropriate measurement unit codes are determined from the transducer definitions in RAM along with the individual measurement scale factors and assigned to variables for later use in display and plot operations. Internally, collection and manipulation of data proceeds with values which are scaled in internal units and are converted to conventional measurement units only at the time of output.

Before the actual flow gain test proceeds, a null bias test is run to determine any bias current that is needed to drive the UUT to a true null condition when no command signal current is applied. By convention channel 2 of the analog command signal bus 76 is selected as the bias or offset channel and one of the digital to analog converters 124, 126 is commanded to output a signal value corresponding to the required offset and its multiplexer connects the signal to channel 2. With the proper bias set, both control point pressures (C1, C2) are equal to each other when 0 main excitation current is applied to the UUT.

Before the known bias current is determined the operator is presented with a menu option to use a previously calculated value, to use a value of zero, or to experimentally determine a new value for the new bias. If the operator enters a specific bias value, the testing proceeds immediately using this value. Otherwise, the operator is prompted to place the hydraulic circuit in a condition for determining hydraulic null. In a semi-automatic example the operator would close valves V1 148 and V2 150. In a fully automatic example, this action is performed by the data processing system 12. When all operator action is completed the continue key is pressed. The system 10 then proceeds with the test procedure for null bias determination. Upon completion of this determination the system 10 resets the valves V1 148 and V2 150 to open and prompts the operator to make any operator required changes in the hydraulic circuit. Operation continues when the continue key is pressed.

Next, the type of flow rate transducer being used is determined from the transducer definition data. If it is a positive displacement cylinder then a set-up excitation cycle must be performed prior to any data collection. The established value of null bias is required for this excitation set-up.

Once the initialization and control data has been determined, the collection of actual data begins. With the excitation output offset by the established null bias value, collection begins at −115% of rated current and proceeds in a positive going direction through zero to +115% of rated current. The step direction is then reversed and drive current is reduced back through zero to the starting value of −115% of rated current. This procedure uses the sample size, sample step size, measurement gains and sample interval which were previously determined during the initialization procedure.

The sample collection loop contains the following steps for each determined sample.

1. Set the output current to the last calculated value.
2. Delay for the sample interval.
3. Measure and store the UUT current and the control port flow using the specified gain values.
4. If the current sample number is greater than the sample size divided by two, calculate a new value for output equal to the last value minus the sample step size, otherwise calculate a new value for output equal to the last value plus sample step size.
5. Increment the number of samples, N, and continue the loop if not done.

The data collection loop controls the excitation current over the prescribed range and creates two measurement value arrays in RAM of sample size. One is for the measured excitation current and the other for the measured control flow response.

The data samples are now adjusted by subtracting the drive current bias from the corresponding drive current data points in order to present the test results as though null bias were actually zero. This enables the system to present data and draw plots which show clearly the symmetry of the UUT performance. The value of the null bias current is displayed and printed for separate evaluation.

Figure 10:
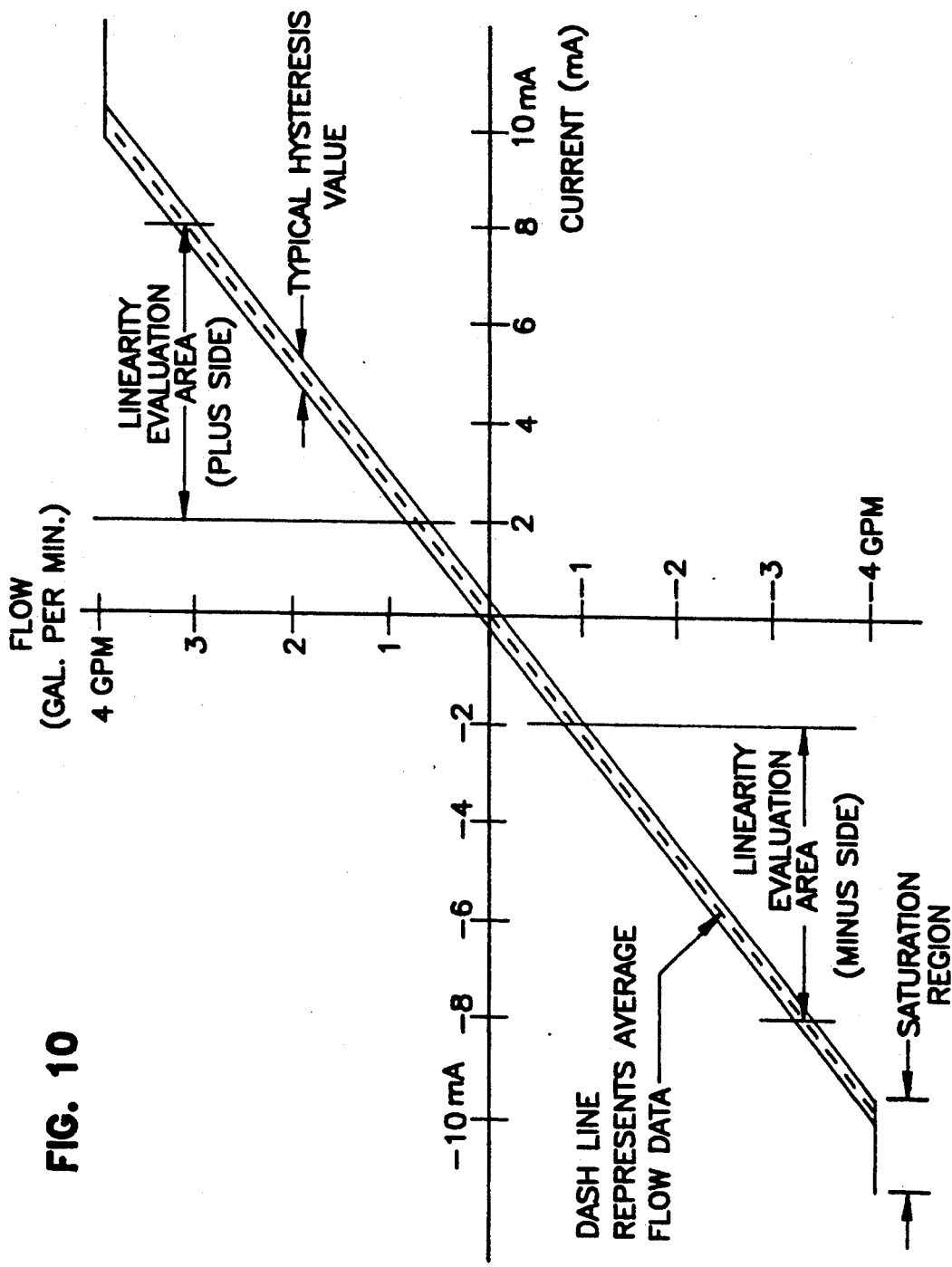
FIG. 10 is a somewhat idealized sample flow rate gain plot for the analyzer system shown in FIG. 1.

While the entire minus-to-plus-to-minus loop of data points is needed to determine the effects of hysteresis, for certain other analyses the full loop is not used. Therefore a third set or array of data points is created from the flow data as adjusted for offset bias. This third array contains the average value for corresponding pairs of data points which are taken in respectively ascending and descending order. A somewhat idealized flow gain data plot for a typical servovalve is shown in FIG. 10.

The operator is now prompted to indicate whether printing or plotting of test results is desired and corresponding action is taken.

If the UUT definition enables hysteresis analysis, this analysis is now performed. The end points of the data are excluded from hysteresis analysis since any of the effects of flow saturation are not to be part of the hysteresis analysis. This exclusion is accomplished by excluding data points taken where the drive current is greater than + or −80% of rated current as well as data points in areas with an incremental slope value that is less than 60% of the average slope of the curve within + or −80% of rated current.

The analysis calculates the horizontal (excitation) distance between values of equal flow for each excitation value. From the − extreme to the + extreme (excluding the low slope and end regions). Each calculated value is tested for a new maximum value, yielding at completion the largest hysteresis value and its location on the curve. The results are displayed in units of rated current and units of percent of rated current. A printout occurs if plot mode has been enabled.

Linearity and symmetry analysis are now performed if they have been requested in the UUT definition. The average flow data is used to calculate the normal flow gain value for the UUT. This is accomplished by the use of standard linear regression techniques applied to the portion of the data between 20 and 80% of rated current on both sides of zero. This analysis yields a slope and an intercept from each side (+ and −) which are also used for linearity (non-linearity) analysis.

Initially the slope value is used to generate a display (and if requested printout) of the normal flow gain in units of rated flow / units of rated current. Symmetry analysis is accomplished by comparing the individual slopes of data on either side of zero. That is, +data v.

—data. The actual displayed (and printed) result is a value of asymmetry equal to the difference between + and − slopes expressed as a percentage of the larger of the two slopes. The non-linearity analysis is performed next by comparing each flow data point in the linearity testing range with an ideal flow data point calculated from the previously determined slope and intercept operating on each value of current in the data set. Non-linearity is displayed and printed as the largest value of the comparisons, on the deviation from the normal straight line. It is expressed as a value of excitation in units of rated current and in units of percent of rated current. The location on the curve of that largest deviation is also indicated.

The next item of analysis is saturation analysis. Saturation analysis uses the average flow data to determine the maximum width (in excitation units) of end areas with slopes less than 85% of the normal slope.

The final data presentation is for the specifically selected flow rate test values if identified in the UUT definition. These are displayed (and printed) to provide visual or printed value verification without manual analysis of the plot data.

After all of the analysis has been completed, the system 10 indicates that the test is complete and prompts the operator to select another test from a list of tests which have been defined in the UUT definition.

Referring now more specifically to the step of determining sample step size as shown in FIG. 10. The following information is made available to the system 10 by the UUT and transducer definitions, UUT rated circuit, servo amplifier full scale output, and the designated number of samples or sample size. In this example the valve being tested has a rated current of 10 Ma and a rated flow rate of 4.0 gallons per minute. The sample step size will be the range of excitation divided by the number of samples and attenuation will be the output sensitivity divided by the servo amplifier full scale output sensitivity.

The size of each increment in excitation is seen to be the range of excitation from beginning to end divided by the number of steps or the sample size. In the example of the flow gain test, the range of excitation is four times 115% of rated current, i.e., from −115% to 0, from 0 to +115%, from +115% to 0, and from 0 to −115%. For the present example it will be assumed that a sample size of 576 has been specified in the UUT definition as was for the case of UUT A in Table 5.

Servo amplifier attenuation is required to scale the amplifier for compatibility with the UUT rated current. The most commonly used servo amplifier is SERVO1 80 (FIG. 2) with a full scale output of 100 MA. For this example we assume that the UUT has a full scale rated current of 100MA. The extra 90MA of capacity is not needed and if the sensitivity to the input command is not changed it will be very difficult to generate excitation steps with sufficient resolution to perform a meaningful test.

The excitation input signal is generated by one of the digital to analog converters 124, 126 which has an output voltage range of +−5 volts corresponding to a digital command signal on digital data bus 16 of + or −2047. The actual digital command signal range may vary with different converters but +−2047 is typical. For the present example the full scale resolution of the servo amplifier 80 and digital to analog converter 124 would be 100 milliamps/2047 BITS=0.0488 MA/BIT without attenuation. This resolution is not considered adequate for high quality testing of a 10 milliamp rated current servovalve and is therefore increased by introducing attenuation into command attenuator 94 (FIG. 4).

To initiate the scaling procedure a trial value for the sample steps is first calculated by dividing the desired range of excitation by the sample size. In the present example, the range of excitation involves four excursions between 0 and + or −1155 of rated current of 10 MA. The full excursion current is thus 4×1.15×10=46 MA. The proposed sample step size thus becomes 46MA/576 steps equals 0.07986 MA/step. Based upon experience, the desired resolution is set by program design at 0.1% of rated current per bit. For a 10 milliamp rated current unit under test, this becomes 0.01 milliamp per bit. Thus to achieve this sensitivity the full scale output of the servo amplifier must be reduced. The command attenuator is used to reduce the full scale output and hence increase the command resolution. A trial value for the sample step size is first calculated. For this example the full double range of 46 milliamps is divided by the 576 data points to produce a step size of 0.07986 milliamps per step. This number is then divided by the desired output scale of 0.01 milliamp per bit to produce 7.986 bits per step. Subsequent fixed point math processing would truncate this number to 7 so it is first rounded upwards to 8 during the scaling procedure to provide better precision. A trial step size value of 8 bits is thus determined and then tested for sufficiency.

A trial value for the attenuation must now be calculated. To do this the desired output sensitivity is divided by the servo amplifier full scale output sensitivity. For the present example 0.01 MA per bit is divided by 0.0488 MA per bit to produce a quotient of 0.2048. Since this value is between 0.001 and 1.0, the trial value for attenuation is tentatively acceptable. It will be remembered that the actual output value for attenuation must be a digital integer between 0 and 1023. Therefore the output value for that integer is calculated as 0.2048×1024−1=208. The actual attenuation is then calculated and determined by dividing the actual output integer by 1,023 (208/1,023=0.2033).

Now the actual output sensitivity may be determined by using the actual attenuation and the known servo amplifier full scale output sensitivity. For this example the output sensitivity becomes 0.2033×0.048852 MA/BIT=0.00993 MA/BIT.

The actual sensitivity, the digital sample step, and the sample size are now cross checked with the desired range to determine if further adjustment is needed. The quadruple full current range is now calculated as sample step size of 8 × sample size of 576 × output sensitivity of 0.00993 MA/bit to produce a range of 45.75 MA. The error of 0.25 MA is less than 2% of the required full range so the trial step size is determined to be adequate. If the recalculated range is different from the desired range by more than 2% of the desired range then the sample size is adjusted up or down in steps of two (even numbers are required for sample size) until the difference drops below 2%.

The output sensitivity is then compared with the excitation input measurement sensitivity and the measurement gain is adjusted upwards in powers of two until the measurement sensitivity is equal to or less than ½ the servo amplifier output sensitivity. For example, the input sensitivity for a gain of 1 is 100 MA per 2,047 bits=0.048852 milliamp per bit. Output sensitivity is 0.00993 MA per bit. One half of 0.00993 is 0.004965 MA per bit. The input sensitivity of 0.048852 divided by output sensitivity of 0.004965=9.83. Since this is greater than 8 and less than 16 the next higher power of 2 or 16 is selected for the measurement gain and the input sensitivity for excitation measurement will be input sensitivity of 0.048852/16=0.0030533 MA/bit.

The null bias procedure now will be described in conjunction with FIG. 11 and FIG. 12 to which further reference is now made. The null bias procedure presumes that the null condition may be located anywhere in the range of −rated excitation to +rated excitation. A polarity convention is also established such that a positive to negative going current generates a positive going differential pressure response. This is somewhat arbitrary in that the definition of differential pressure is not standardized. However, any undesirable effects of this arbitrary definition are essentially eliminated by the flexibility of the UUT definition capability. Specifically, the signal path or transducer names used to identify control port pressures can be interchanged to reverse the response polarity without affecting any other measurement or analysis.

Referring to FIG. 3, it will be noted that transducers AC1 and AC2 are connected to servovalve control ports C1 and C2 respectively. The software of the analyzer, by the presumption of polarity described, defines the differential pressure (DP) as that pressure represented by the difference between pressures at point C1 and point C2, $$DP = C1 \text{ pressure} - C2 \text{ pressure} \qquad (EQ\ 3)$$

Where a positive going current will increase pressure at port C1 with respect to part C2. Thus the UUT definition table for the present example would assign the transducer name AC1 to port C1 pressure measurement and transducer AC2 to port C2 pressure measurement. If during the first steps of this procedure it is determined that the differential pressure response is inverted, i.e. C2 increases with respect to C1 for increasing current, then it is sufficient to return to the UUT definition mode and to assign AC1 to port C1 and AC2 to C2 to obtain reversal of the response without any other effect.

Figure 11:
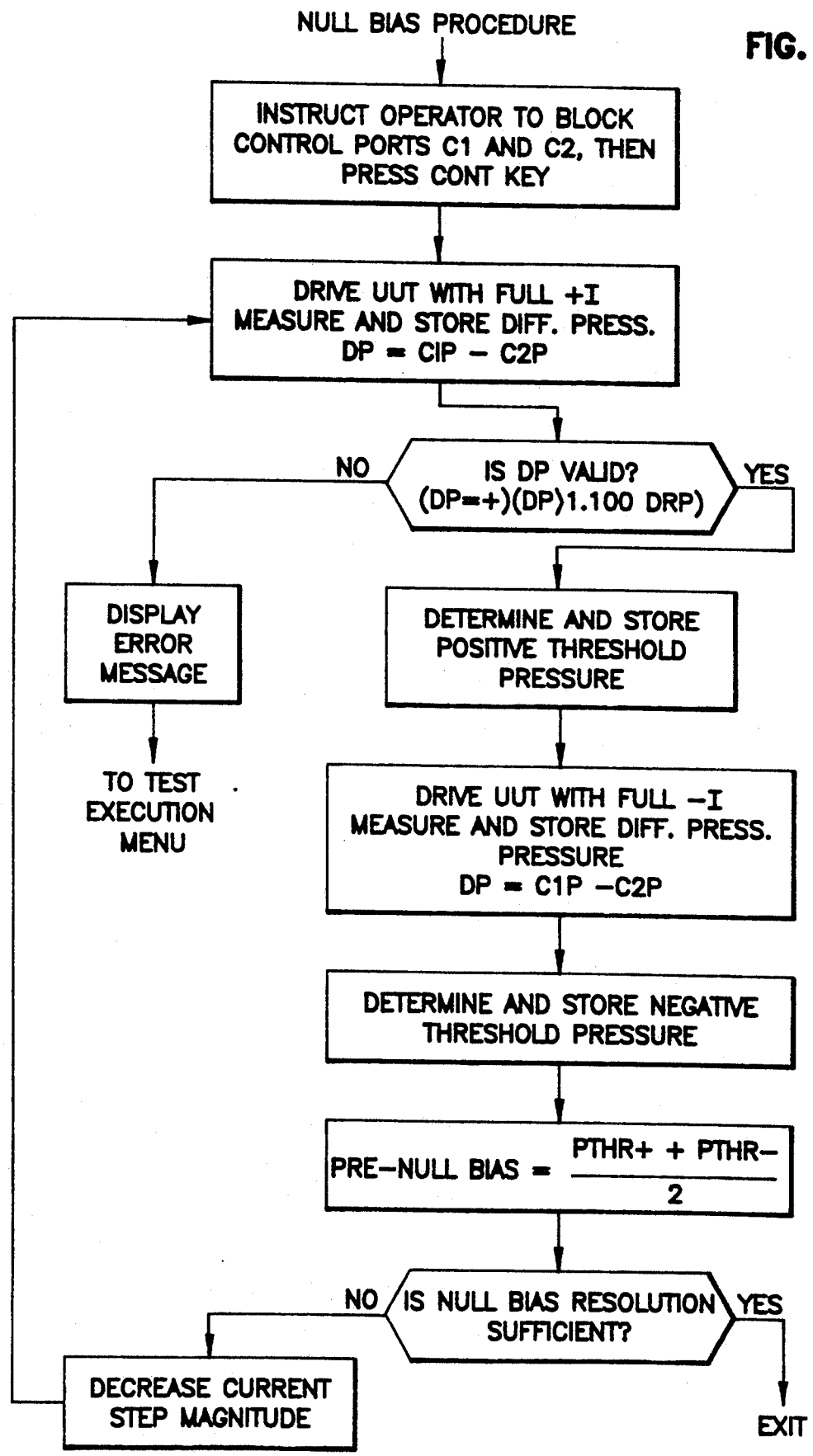
FIG. 11 is a flow chart showing a portion of the program used in the servovalve analyzer shown in FIG. 1.
Figure 12:
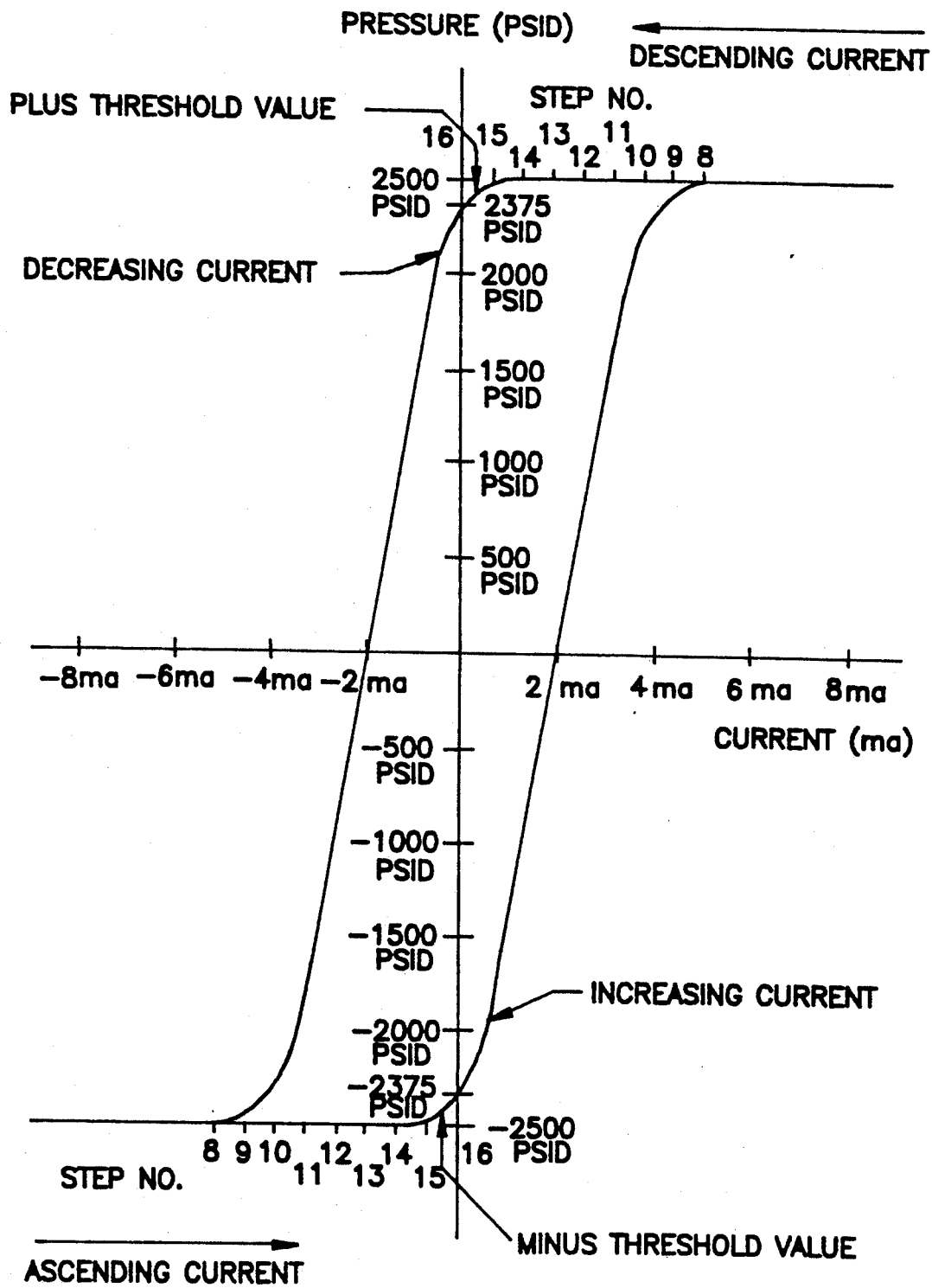
FIG. 12 is a graphical representation helping to explain the no bias procedure.

Referring now to FIG. 11 and FIG. 12, the null bias procedure begins with the operator being instructed to place the hydraulic circuit in a blocked control port condition and then to press the CONT key. Next, excitation is set to full positive rated current and differential pressure (C1 −C2) is measured. This value is stored as a reference value for subsequent steps and is immediately tested for validity and polarity. The polarity must be positive and to be valid the magnitude must be greater than 10% of the defined rated pressure (DRP). The validity step is taken to insure that nonsense results such as may occur when operating pressure is too low are not obtained. If these tests are not passed the system displays an error message and the entire test is aborted until the operator commands return to the test execution menu.

Assuming that the validity test is passed, an iterative loop is entered to determine and store positive threshold pressure. The excitation current is reduced from maximum +rated current toward −rated current in small steps of 1/16 th of rated current. For each step the differential pressure is determined (C1 −C2 pressure) and compared with 95% of the differential pressure measurement which was previously taken at full rated current and stored. The drive current is repeatedly reduced in steps of 1/16 th of rated current until the differential pressure for the last step becomes less than 95% of the reference measurement. Further stepping is then terminated and a value of output current half way between the two latest sample values is determined and stored as the +threshold.

The excitation is now set at −rated current and the measured delta P becomes the new reference value. A second stepping procedure is now commenced wherein the excitation current is increased from −rated value toward +rated current in small steps of 1/16 th of rated current. At each step the differential pressure (C1 pressure−C2 pressure) is determined and compared with 95 of the new reference measurement. When the last step produces a value less than 90% of the reference, a value for −threshold is determined to be half way between the values for the last two steps and is stored.

A preliminary value for null bias is now calculated as the sum of the +and −threshold values divided by 2. This determination is normally sufficient. However, for further refinement an additional cycle of high resolution data collection between −threshold and +threshold can be performed with a greater step resolution such as 1/32 nd of the rated current followed by further analytical steps to arrive at a value for null bias that is accurate to the level of basic current accuracy. The original null bias determination is considered sufficient for the present example.

Before a flow rate test is run using a transducer of the positive displacement cylinder type a dry run is performed at a speed 15% slower than the actual run to assure that the cylinder does not bottom out during the actual data cycle. The initialization dry run is actually only ¾ of a cycle and proceeds from 0 to +peak current, from +peak current to 0 and from 0 to −peak current. The actual test run may then proceed beginning at −−peak current.

While there have been shown and described above particular arrangements of servovalve analyzer systems in accordance with the invention for the purpose of enabling a person of ordinary skill in the art to make and use the invention, it will be appreciated that the invention is not limited thereto. Accordingly, any modifications, variations or equivalent arrangements within the scope of the attached claims should be considered to be within the scope of the invention.

TABLE 1

| INITIAL RUN MENU |
|---|
| Select a [port] part no.: |
| Select test name: |
| Press the "RUN" key to run a selected test. |

TABLE 2

| MAIN MENU SELECTION |
|---|
| Display Test Article (UUT) Directory |
| Create a new UUT Definition |
| Make a new UUT Definition from an Existing Definition |
| Delete a UUT Definition |
| Change/Display a UUT Definition |
| Display Transducer [Direction] Directory |
| Create a New Transducer Definition |
| Delete a Transducer Definition |
| Change/Display a Transducer Definition |
| Enter Time of Day |
| Select Plot Paper Size |

TABLE 3
TRANSDUCER TYPE MENU

Analog Flow Turbine
Digital Flow Turbine
Differential Pressure
Dynamic Flow Actuator
Flow Metering Cylinder
Force
LVDT (Linear Variable Diff. Transf.) [(DOS)]
Pressure
Temperature (RTD)
Velocity
Voltage
Current
DC position
Servo amplifier
Signal Generator
Analog to Digital Converter

TABLE 4A
TRANSDUCER DEFINITION MENU FOR PRESSURE TRANSDUCER

| | |
|---|---|
| Device Name: | SUPPLYA |
| Analog Channel: | 0 |
| Units: | PSIG |
| FULL Scale: | 5000 PSIG |
| Calibration Date: | 15 December 86 |
| Calibrated Full Scale: | 4,986 PSIG Full Scale Entry: 4850 PSIG |
| Calibrated Offset: | 0.102 PSIG Near Zero Entry: 0.0 PSIG |

TABLE 4B
TRANSDUCER DEFINITION MENU FOR FLOW TRANSDUCER

| | |
|---|---|
| Device Name: | Q12G |
| Analog Channel: | 10 |
| Units: | GPM |
| Full Scale: | 12 GPM |
| Calibration Date: | 15 December 86 |

| Multipoint Calibration: | No. of points: 1–0 |
|---|---|
| APPLIED STIMULUS | A TO D READING |
| 1 | 0.105 GPM | 4.0 |
| 2 | 0.200 GPM | 17.0 |
| 3 | 0.520 GPM | 63.0 |
| 4 | 1.000 GPM | 164.0 |
| 5 | 5.000 GPM | 901.0 |
| 6 | 10.000 GPM | 1678.0 |
| 7 | 10.550 GPM | 1730.0 |
| 8 | 11.050 GPM | 1822.0 |
| 9 | 11.500 GPM | 1914.0 |
| 10 | 12.100 GPM | 2006.0 |

TABLE 5
CREATE A NEW UUT DEFINITION

| | UUTA | UUTB |
|---|---|---|
| NAME: | UUTA | UUTB |
| FLOW VOLUME UNITS: | CU. IN. | Gallons |
| FLOW TIME UNITS: | SEC | Min. |
| RATED CURRENT UNITS: | Amperes | Milliamperes |
| RATED FLOW: | 1.0 CU In Per Sec. | 10 [Gallon] Gallons Per Min |
| RATED CURRENT: | 1.0 Ampere | 8 Milliamperes |
| PRESSURE UNITS: | PSIG | PSIG |
| RATED SUPPLY [MEASURE] PRESSURE: | 8000 PSIG | 3000 PSIG |
| RATED RETURN PRESSURE: | 50 PSIG | 50 PSIG |
| SUPPLY XDCR NAME: | XDPA | XDPB |
| RETURN XDCR NAME: | XDRA | XDRB |
| C1 XDCR NAME: | AC1 | BC1 |
| C2 XDCR NAME: | AC2 | BC2 |
| SERVO AMPLIFIER NAME: | SERVO2 | SERVO1 |
| FILTERING: | YES | YES |
| QUARTER CYCLE TIME: | 8 SEC | 10 SEC |
| SLOW CYCLE TIME: | 45 SEC | 20 SEC |
| FLOW GAIN TEST: | YES | YES |
| FLOW XDCR NAME: | Q2C | Q12G |
| HYSTERESIS ANALYSIS: | YES | YES |
| NON LINEARITY ANALYSIS: | YES | YES |
| [ASSYMETRY] ASYMMETRY ANALYSIS: | YES | YES |
| SATURATION ANALYSIS: | YES | YES |
| TOTAL NO. TEST POINTS: | 576 | 480 |
| FLOW PRESET POINTS | | |
| 1 | 10% | 10% |
| 2 | 20% | 20% |
| 3 | 40% | 50% |
| 4 | 60% | 80% |
| 5 | 100% | 110% |
| NULL SHIFT TEST: | YES | YES |
| SUPPLY REFERENCE: | 8000 PSIG | 3000 PSIG |
| SUPPLY TEST: | 6000 PSIG | 3500 PSIG |
| RETURN REFERENCE: | 0.0 PSIG | 100 PSIG |
| RETURN TEST: | 0.0 PSIG | 0.0 PSIG |
| NULL AREA FLOW GAIN TEST: | YES | YES |
| NULL AREA FLOW XDCR NAME: | Q2C | Q12G |
| LAP ANALYSIS: | NO | YES |
| THRESHOLD TEST: | YES | NO |
| RESOLUTION TEST: | NO | NO |
| THRESHOLD/RESOLUTION XDCR [HOME] NAME: | Q2C | (None) |
| INTERNAL LEAKAGE TEST: | YES | YES |
| INTERNAL LEAKAGE FLOW XDC[F]R: | Q2C | Q2000CC |
| PRESSURE GAIN TEST: | YES | YES |
| POLARITY ANALYSIS: | YES | YES |
| NULL PRESSURE ANALYSIS: | YES | YES |
| FLUSH AND BLEED TEST: | NO | YES |
| FLUSH FREQUENCY: | N/A | 2.0 Hz |
| FLUSH AMPLITUDE: | N/A | 100% |
| FLUSH DURATION: | N/A | 5.0 MIN. |
| PROOF PRESSURE TEST: | YES | YES |
| SUPPLY PROOF PRESSURE: | 10,000 PSIG | 4500 PSIG |
| RETURN PROOF PRESSURE: | 8,000 PSIG | 3000 PSIG |
| PROOF TEST CURRENT: | 0.0 Ma | 0.0 Ma |
| DYNAMIC RESPONSE TEST: | YES | YES |
| DYNAMIC ACTUATOR NAME: | Q504 | Q506 |
| 1 | 0.5Hz | 2.0Hz |
| 2 | 1.0Hz | 3.0Hz |
| 3 | 2.0Hz | 4.0Hz |
| 4 | 5.0Hz | 5.0Hz |
| 5 | 10.0Hz | 8.0Hz |
| 6 | 15.0Hz | 10.0Hz |
| 7 | 20.0Hz | 15.0Hz |
| 8 | 50.0Hz | 20.0Hz |
| 9 | 80.0Hz | 30.0Hz |
| 10 | 100.0Hz | 50.0Hz |
| 11 | 150.0Hz | 80.0Hz |
| 12 | 200.0Hz | 100.0Hz |
| 13 | 300.0Hz | 150.0Hz |
| 14 | 400.0Hz | 200.0Hz |
| 15–20 | 0 | 0 |
| PEAK CURRENT AMPLITUDE: | 25% | 10% |
| SWEEP START FREQUENCY | 0.5Hz | 0.2Hz |
| SWEEP END FREQUENCY | 400.0Hz | 200.0Hz |

TABLE 6
SAMPLE VALUE ENTRY

| | UUTA | UUTB |
|---|---|---|
| · SUPPLY/RETURN VALVES: | UUTA | UUTB |
| C1/C2 Valves: | Open | Open |
| Y Valves | A | B |

What is claimed is:

1. An analyzer system for analyzing hydraulic servo-mechanism units under test, the system comprising:
   a source of hydraulic power;
   a transducer system including at least one sensing transducer for providing data for analysis, the transducer being coupled to a hydraulic servo-mechanism unit under test and sensing an operating parameter of the unit during operation, and at least one controllable device for operating the unit under test, the transducer system further including means for selectively connecting the unit under test to the source of hydraulic power;

an interface system coupled to the transducer system, for receiving and conditioning data signals to and from the transducer system, the interface system also including means for controlling the at least one controllable device;

a data processing system coupled to the interface system and including means for receiving the data signals, the data processing system being responsive to operator commands for commanding a test sequence to the unit under test and for analysis of the data signals in response thereto, and for generating human understandable indications of the status of the unit under test during commanded test conditions, the data processing system having a nonvolatile data store of a table of data including a name and at least one item of information characterizing a test to be performed, the data processing system including means for accessing the table in response to the name and coupled to provide signals to the interface system for controlling the controllable device to execute a test sequence for the unit under test in response to at least one item of characterizing information stored in the table accessed in response to the name; and the table of data in the nonvolatile data store including at least one item of information characterizing the sensing transducer for compensating signals from the transducer in response to the name.

2. An analyzer system as set forth in claim 1 above, wherein the transducer system comprises a plurality of transducers for sensing a plurality of different operating parameters of the unit under test, means for generating analog command signals in response to digital control signals commanded by the data processing system, and means for selectively combining signals from the plurality of transducers with the analog command signals for controlling the at least one controllable device.

3. An analyzer as set forth in claim 1 above, wherein the interface system comprises valve means for controlling hydraulic flow from the source of hydraulic power to a plurality of hydraulic ports on the unit under test, and valve interface means responsive to signals from the data processing system for operating the valve means to selectably direct hydraulic flow between ports on the unit under test.

4. An analyzer system for hydraulic servo-mechanism units under test having responses to applied excitation signals, the responses measurable by at least one transducer for each unit under test, the analyzer system comprising:

a digital data processing system for processing data for analysis of a hydraulic servo-mechanism unit, the processing system storing a plurality of test definition tables containing test sequences and a plurality of transducer definition tables corresponding to the transducers measuring responses from the units under test, each transducer table including transducer identification and calibration data;

a transducer interface system including at least one sensing transducer, a digital to analog converter connected to receive a digital command signal from the data processing system and generate an analog signal in response thereto, a servo amplifier connected to receive the analog signal from the digital to analog converter and to apply a control signal to the unit under test, a signal conditioning circuit connected to receive a signal from the at least one sensing transducer, and an analog to digital to analog converter to receive an analog signal from the digital to analog converter and to provide a digital signal to the digital data processing system in response thereto; and the digital data processing system including means for operator selection of a unit definition table to command at least one test sequence listed in the selected test unit definition table for exercising and analyzing the unit under test by providing to the digital to analog converter digital command signals within the range of the calibration data for the transducer definition table, the digital data processing system further receiving data from the analog to digital converter representing the measurable response of the unit under test, and interpreting the data in accordance with the calibration data for generating a human readable output representing results of the test.

5. An analyzer system as set forth in claim 4 above, wherein the unit under test is operable under an excitation signal to vary hydraulic flow, wherein the servo amplifier provides an excitation signal for the unit under test, wherein the system includes a plurality of transducers, each responsive to a sensed parameter of operation of the unit under test, and wherein the servo amplifier comprises programmable servo amplifier means responsive to the digital data processing system and including feedback means responsive to selected sensed operative parameters from the transducers.

6. A system for precisely analyzing operating characteristics of different hydraulic powered servomechanism units in selectable test sequences, comprising:

a hydraulic power source;

a transducer system connecting the power source to a unit under test, the transducer system including more than one analog sensing transducer for monitoring operating parameters of the unit under test, and more than one programmable analog device for controlling application of hydraulic power to the unit under test;

an interface system including means connected to the analog sensing transducers for converting analog signals generated thereat to digital signals, and further including means connected to the programmable analog device for applying analog control signals thereto in response to applied digital signals; and a data processing system having a number of changeable test unit definition tables and a number of changeable sensing transducer calibration tables, and including means for operator selection of a test sequence, means for applying digital signals for the selected test sequence to the transducer interface system in accordance with a test unit definition table, and means for interpreting data from the sensing transducers in accordance with the selected transducer calibration table.

* * * * *

UNITED STATES PATENT AND TRADEMARK OFFICE
CERTIFICATE OF CORRECTION

PATENT NO. : 5,235,525
DATED : August 10, 1993
INVENTOR(S) : Jimmy L. Bybee

It is certified that error appears in the above-identified patent and that said Letters Patent is hereby corrected as shown below:

Column 3, line 68, "parts" should read --ports--. Column 8, line 58, after "the" (first occurrence) strike the comma (","). Column 10, line 36, "forautomatic" should read --for automatic--. Column 14, line 27, after "ignored" insert a period --.--. Column 15, line 17, after "this", strike "is". Column 20, line 9, "1155" should read --115%--. Column 21, line 33, after "to", "part" should read --port--. Column 22, line 12, "95" should read --95%--. Column 26, line 11, before "converter" strike "to analog"; line 11, after "converter" insert --connected--.

Signed and Sealed this

Nineteenth Day of April, 1994

Attest:

*Attesting Officer*

BRUCE LEHMAN

*Commissioner of Patents and Trademarks*